United States Patent
Ueda et al.

(10) Patent No.: US 7,145,752 B2
(45) Date of Patent: Dec. 5, 2006

(54) MAGNETIC HEAD APPARATUS HAVING MAGNETIC HEAD SLIDER AND MAGNETIC DISK APPARATUS EQUIPPED WITH MAGNETIC HEAD APPARATUS

(75) Inventors: Junsei Ueda, Niigata-ken (JP);
Hirohisa Ishihara, Niigata-ken (JP);
Yasuyuki Kondo, Niigata-ken (JP);
Satoshi Morikawa, Niigata-ken (JP);
Keishi Nakashima, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 436 days.

(21) Appl. No.: 10/818,488

(22) Filed: Apr. 5, 2004

(65) Prior Publication Data
US 2004/0201924 A1 Oct. 14, 2004

(30) Foreign Application Priority Data
Apr. 10, 2003 (JP) ............................ 2003-106240

(51) Int. Cl.
*G11B 5/60* (2006.01)
(52) U.S. Cl. ................. 360/235.6; 360/236; 360/236.2
(58) Field of Classification Search ............. 360/235.6, 360/236, 236.2
See application file for complete search history.

(56) References Cited

U.S. PATENT DOCUMENTS

| | | | |
|---|---|---|---|
| 5,754,367 A * | 5/1998 | Chang et al. | 360/235.6 |
| 5,917,678 A | 6/1999 | Ito et al. | |
| 6,603,638 B1 * | 8/2003 | Yotsuya | 360/235.6 |
| 6,628,480 B1 * | 9/2003 | Kohira et al. | 360/235.6 |
| 6,646,832 B1 | 11/2003 | Anaya-Dufresne et al. | |
| 6,680,821 B1 * | 1/2004 | Kang | 360/236.2 |
| 6,771,468 B1 * | 8/2004 | Levi et al. | 360/236.2 |
| 6,842,309 B1 * | 1/2005 | Kohira et al. | 360/235.6 |
| 6,873,496 B1 * | 3/2005 | Sun et al. | 360/236.2 |
| 6,879,464 B1 * | 4/2005 | Sun et al. | 360/236.2 |
| 7,038,883 B1 * | 5/2006 | Tsuchiyama et al. | 360/235.6 |
| 2002/0131209 A1 | 9/2002 | Anaya-Dufresne et al. | |

FOREIGN PATENT DOCUMENTS

| | | |
|---|---|---|
| JP | 09-153210 | 6/1997 |
| JP | 2001-283549 | 10/2001 |
| JP | 2002-230732 | 8/2002 |

\* cited by examiner

*Primary Examiner*—Robert S. Tupper
(74) *Attorney, Agent, or Firm*—Brinks Hofer Gilson & Lione

(57) ABSTRACT

A magnetic head apparatus including a magnetic head slider having an overall front half region area (S) and a step surface area (S1) and a positive-pressure generating surface area (S2) both in the front half region, such that the area ratio S1/S is about 0.180 to about 0.232 and the area ratio S1/S2 is about 0.30 to about 0.47. With this arrangement a difference in pitch angles of the magnetic head slider at the moment when it is just levitated and during levitation is large, and a variation of the pitch angle due to a pressure change is small, thereby preventing damage to a magnetic element within the magnetic head slider while achieving a stable levitation attitude of the magnetic head slider.

15 Claims, 19 Drawing Sheets

MAGNETIC HEAD APPARATUS HAVING MAGNETIC HEAD SLIDER AND MAGNETIC DISK APPARATUS EQUIPPED WITH MAGNETIC HEAD APPARATUS

This application claims the benefit of Japanese Patent Application No.: 2003-106240, filed on Apr. 10, 2003, which is incorporated herein by reference.

BACKGROUND

1. Technical Field

The present invention relates to a magnetic head apparatus having a magnetic head slider equipped with a magnetic element for performing a read and/or write operation from and/or into a magnetic disk and also relates to a magnetic disk apparatus equipped with the magnetic head apparatus. More particularly, the present invention relates to a magnetic head apparatus that changes in pitch angles of the magnetic head slider at the moment when it is just levitated from the magnetic disk and also varies the pitch angle due to a pressure change to prevent damage to the magnetic element and to stabilize the levitation attitude of the magnetic head slider. The present invention also relates to a magnetic disk apparatus equipped with the magnetic head apparatus.

2. Description of the Related Art

FIGS. 21 to 23 are plan views schematically illustrating disk-facing surfaces of magnetic head sliders disclosed respectively in Japanese Unexamined Patent Application Publications Nos. 2001-283549, 9-153210, and 2002-230732.

A magnetic head slider M1 shown in FIG. 21 has a step surface A, positive-pressure generating surfaces B, and a indented surface C formed on the disk-facing surface thereof. The step surface A and the positive-pressure generating surfaces B are formed so as to extend higher than the indented surface C, and also the positive-pressure generating surfaces B are formed so as to extend higher than the step surface A. The step surface A is formed so as to have a wide area extending toward a leading-side end surface S1 of the magnetic head slider M1. The positive-pressure generating surfaces B are formed closer to a trailing-side end surface St than the step surface A. The positive-pressure generating surfaces B are divided into two parts in the width direction (in the X direction indicated in the figure) and a step surface A1 resides therebetween. The surfaces B are formed integrally with and extend from the step surface A, which lies closer to the leading-side end surface S1 than the positive-pressure generating surfaces B.

The indented surface C is formed closer to the trailing-side end surface St than positive-pressure generating surfaces B and the step surface A.

As shown in FIG. 21, the magnetic head slider M1 has a magnetic element disposed close to the trailing-side end surface St. The magnetic element performs a read and/or write operation from and/or into a magnetic disk. The magnetic element is exposed to the disk-facing surface. The magnetic head slider M1 has a magnetic-element-facing surface E having the magnetic element disposed therein and extending so as to be flush with the positive-pressure generating surfaces B.

In contrast to the structure of the magnetic head slider M1 shown in FIG. 21, a magnetic head slider M2 shown in FIG. 22 has a structure in which the positive-pressure generating surface B is formed so as to extend long in the width direction (in the X direction indicated in the figure) and is not divided into two parts. As shown in FIG. 22, the magnetic head slider M2 has two positive-pressure generating surfaces B1 formed closer to the trailing-side end surface St than the positive-pressure generating surface B so as to be separated away from each other in the width direction (in the X direction indicated in the figure). The positive-pressure generating surfaces B1 and the positive-pressure generating surface B are connected to each other, in the longitudinal direction (in the Y direction indicated in the figure), with connecting surfaces A2 formed so as to be flush with the step surface A.

In contrast to the structure of the magnetic head slider M2 shown in FIG. 22, a magnetic head slider M3 shown in FIG. 23 has a structure in which the magnetic-element-forming surface E is formed so as to extend in the width direction (in the X direction indicated in the figure), and the indented surface C is interposed between the positive-pressure generating surface B and the magnetic-element-forming surface E.

In any of the magnetic head sliders M1, M2, and M3 shown in FIGS. 21 to 23, with rotation of a magnetic disk, air from the leading-side end surface S1 and flows below the step surface A and is compressed between the magnetic disk and the positive-pressure generating surface(s) B so as to generate a positive pressure, whereby a portion of the magnetic head slider extending close to the leading-side end surface S1 is raised more upward from the magnetic disk than another portion thereof extending close to the trailing-side end surface St. In addition, when the rotating speed of the magnetic disk increases, the magnetic head slider is levitated from the magnetic disk. In the levitated state, the magnetic element of the magnetic head slider maintains its inclination attitude so as to lie close to the surface of the magnetic surface while keeping an appropriate balance between positive and negative pressure that is mainly generated across the positive-pressure generating surface B and the indented surface C, respectively. In the above-mentioned inclination attitude, the magnetic element performs a read and/or write operation from and/or into the magnetic disk.

In the meantime, the magnetic head sliders M1, M2, and M3 shown in FIGS. 21 to 23 have the respective following problems.

In the magnetic head sliders M1 shown in FIG. 21, as described above, the positive-pressure generating surfaces B are divided into two parts in the width direction and have the step surface A1 formed therebetween. With this structure, at the moment when the magnetic head slider M1 is just levitated from the magnetic disk, air is likely to flow from and above the step surface A toward and above the step surface A1, whereby an extremely high positive pressure is unlikely to be generated.

Accordingly, although it is expected that the leading-side end surface S1 of the magnetic head sliders M1 is unlikely to be suddenly raised from the magnetic disk at the moment when the magnetic head slider M1 is just levitated from the magnetic disk. Since the positive-pressure generating surface B has a small area ratio, it is expected that a positive pressure generated across the positive-pressure generating surfaces B is unlikely to become high at the moment when the magnetic head slider is just levitated from the magnetic disk. Also, the magnetic head slider is unlikely to have a levitation attitude with which the trailing-side end surface St comes closer to the magnetic disk than the leading-side end surface S1. Accordingly, the distance between the magnetic element disposed close to the trailing-side end surface St and the magnetic disk cannot be made effectively smaller. Hence, a large spacing loss caused by the above structure does not allow a magnetic head apparatus capable of properly coping with the requirement of a higher recording density to be achieved.

In the magnetic head slider M2 shown in FIG. 22, since the positive-pressure generating surface B extends along the entire width of the slider (in the X direction indicated in the figure) without being divided into two parts, a high positive pressure is generated between the step surface A and the positive-pressure generating surface B at the moment when the magnetic head slider M2 is just levitated from the magnetic disk. Accordingly, the leading-side end surface S1 of the magnetic head slider M2 is more likely to be raised from the magnetic disk than that of the magnetic head slider M1 shown in FIG. 21.

As will subsequently be explained according to the results of simulation experiments, it has been found that the positive pressure during levitation becomes excessively high without appropriately setting the area ratio of the step surface A. Hence, the magnetic element disposed close to the trailing-side end surface St comes into contact with the surface of the magnetic disk at the moment when the magnetic head slider M2 is just levitated from the magnetic disk, thereby causing the magnetic element to be damaged.

In the magnetic head slider M3 shown in FIG. 23, the step surface A has a substantially wider area than the positive-pressure generating surface B. Hence, with the structure of the magnetic head slider M3 shown in FIG. 23, since a positive pressure generated between the step surface A and the positive-pressure generating surface B becomes excessively high, according to the results of the simulation experiments, which will be subsequently described, the leading-side end surface S1 of the magnetic head slider M3 is excessively raised at the moment when the magnetic head slider M3 is just levitated from the magnetic disk. Accordingly, the magnetic element disposed close to the trailing-side end surface St is likely to come into contact with the surface of the magnetic disk.

In other words, the magnetic head slider is preferably formed such that the trailing-side end surface St is raised from the magnetic disk to the extent to which the magnetic element does not come into contact with the surface of the magnetic disk at the moment when the magnetic head slider is just levitated from the magnetic disk. Also, the magnetic head slider is preferably formed such that, during complete levitation of magnetic head slider after the disk has reached at high speed rotation, the trailing-side end surface St having the magnetic element disposed close thereto is declined more downward than the leading-side end surface S1. Also, the magnetic head slider preferably has a levitation attitude with which the magnetic element comes closer to the magnetic disk so as to allow the distance (spacing) between the magnetic element and the surface of the magnetic disk to become smaller.

In order to maintain the above-mentioned preferable levitation attitude during levitation of the magnetic head slider, the proper shape of a part of the disk-facing surface of the magnetic head slider close to the trailing-side end surface St is essential. With the structure of the magnetic head slider, for example, shown in FIG. 23, in which the magnetic-element-forming surface E having a very wide area extends close to the trailing-side end surface St, and the indented surface C is interposed between the positive-pressure generating surface B and magnetic-element-forming surface E, a positive pressure generated across the magnetic-element-forming surface E will become excessively high. After the magnetic head slider M3 has been levitated, a part of the magnetic head slider M3 lying close to the trailing-side end surface St is likely to be raised so as to be away from the magnetic disk due to the positive pressure generated across the magnetic-element-forming surface E. This prevents the magnetic element from being positioned effectively close to the magnetic disk.

Also, with the magnetic head slider whose inclination attitude does not significantly vary due to a pressure change (a fluctuation of airflow) during levitation, a variance of the distance between the magnetic element and the surface of the magnetic disk can be made smaller. Accordingly, stable recording and playback characteristics can be maintained.

SUMMARY

Accordingly, the present invention has been made so as to solve the above problems, and it is an object of the present invention to provide a magnetic head apparatus which makes a difference in pitch angles of a magnetic head slider at the moment when it is just levitated from a magnetic disk and during levitation smaller and also a variance of the pitch angle of the same due to a pressure change smaller in order to prevent damage of a magnetic element and stabilize the levitation attitude of the magnetic head slider, and to provide a magnetic disk apparatus equipped with the magnetic head apparatus.

A magnetic head apparatus according to the present invention includes a magnetic head slider having a read and/or write magnetic element disposed close to a trailing-side end surface thereof; and a supporting member elastically supporting the magnetic head slider above a magnetic disk from a side opposite the disk-facing surface. The magnetic head slider is elastically supported by the supporting member so as to be pivotal in the pitch direction with a pivotal fulcrum disposed on the supporting member. The disk-facing surface has a front half region (S) extending from a leading-side end surface of the magnetic head slider to a phantom line on the disk-facing surface of the magnetic head slider extending in a direction parallel to the trailing-side end surface so as to pass through a phantom point opposed to the pivotal fulcrum of the magnetic head slider. The front half region has a step surface (S1), a positive-pressure generating surface (S2), and an indented surface formed therein from the leading-side end surface toward the trailing-side end surface in that order. The step surface (S1) and the positive-pressure generating surface (S2) protrude more toward the magnetic disk than the indented surface, and the positive-pressure generating surface (S2) protrudes more toward the magnetic disk than the step surface (S1), and a surface area ration S1/S is about 0.180 to about 0.232, and a surface area ratio S1/S2 is about 0.30 to about 0.47.

By setting the area ratios in the above-mentioned respective regions, according to the results of simulation experiments, which will subsequently be described, difference in pitch angles of the magnetic head slider during levitation of the magnetic head slider at the high rotating speed of the magnetic disk. In the experiments, at the rotating speed of 7,200 rpm and at the moment when the magnetic head slider is just levitated from the magnetic disk (in the experiments, the rotating speed of the magnetic disk at the moment of the magnetic head slider being levitated is set at 2,000 rpm) can be increased. The pitch angle is defined as, for example, an angle formed by a phantom line drawn with a predetermined method on the disk-facing surface of the magnetic head slider and the surface of the magnetic disk D. Hereinafter, all pitch angles are defined with the above-mentioned method unless otherwise stated. In other words, the pitch angle of the magnetic head slider can be small at the moment when the magnetic head slider is just levitated from the magnetic disk, thereby preventing the magnetic element from coming into contact with the surface of the magnetic disk, and the pitch angle of the magnetic head slider and the distance (spacing) between the magnetic element and the surface of the magnetic disk during levitation can be made greater and smaller, respectively, thereby achieving a higher recording density. Also, with the foregoing area ratios in the above-mentioned ranges, a difference in pitch angles of the magnetic head slider under pressures at ground level (0 m above sea level) and at high attitude (set at 10 kft (about 3 km) in the experiments) can be made smaller. In other words, a variation of the pitch angle of the magnetic head slider due to a pressure change can be made smaller, and a variance of the distance (spacing) between the magnetic element and the surface of the magnetic disk can be minimized, thereby achieving stable recording and playback characteristics.

The magnetic head apparatus according to the present invention may have a structure in which the disk-facing surface has a rear half region extending from the phantom line 1 to the trailing-side end surface and having an indented surface formed therein extending continuously from the indented surface formed in the front half region, and at least a part of the indented surface formed in the rear half region extends continuously to the trailing-side end surface.

In the magnetic head apparatus according to the present invention, when a phantom line is drawn on the disk-facing surface in the longitudinal direction of the magnetic head slider so as to pass through the phantom point, and the lengths of the overall magnetic head slider in the longitudinal direction and a part of the step surface extending along the phantom line are respectively defined as L and L1, the length ratio L1/L is preferably in a range from about 0.0240 to about 0.065.

According to the results of the simulation experiments, which will be described later, by setting the length ratio L1/L and the foregoing area ratios in the above-mentioned ranges, a difference in pitch angles of the magnetic head slider at the moment when it is just levitated and during levitation can be made more effectively smaller, and also a variance of the pitch angle of the magnetic head slider due to a pressure change can be made smaller.

In the magnetic head apparatus according to the present invention, the disk-facing surface may have at lease one rod-like projection disposed thereon, protruding toward the magnetic disk more than the positive-pressure generating surface.

Also, said at least one rod-like projection is preferably disposed in the rear half region extending from the phantom line to the trailing-side end surface. With the rod-like projection, the magnetic element is effectively prevented from coming into contact with the surface of the magnetic disk.

A magnetic disk apparatus according to the present invention includes the above-stated magnetic head apparatus including the rod-like projection and a magnetic disk disposed so as to face the disk-facing surface of the magnetic head slider. A pitch angle θ1 formed by a supporting surface of the magnetic head slider opposite to the disk-facing surface and the surface of the magnetic disk at the moment when the magnetic head slider is just levitated from the magnetic disk is smaller than a pitch angle θx formed by the supporting surface and the surface of the magnetic disk on the assumption that the magnetic element and the rod-like projection come into contact with the 'surface of the magnetic disk.

When the above condition is satisfied, the magnetic element is prevented from coming into contact with the surface of the magnetic disk at the moment when the magnetic head slider is just levitated from the magnetic disk.

In the magnetic disk apparatus according to the present invention, by setting the foregoing area ratios in the, above-mentioned ranges, the pitch angle θ1 of the magnetic head slider at the moment when the magnetic head slider is just levitated from the magnetic disk can be small.

According to the results of the simulation experiments, when the pitch angle θx is not less than 210 µradians, the pitch angle θx is greater than the pitch angle θ1 of the magnetic head slider at a rotating speed of 2,000 rpm of the magnetic disk, thereby preventing the magnetic element from hitting the magnetic disk during levitation of the magnetic head slider.

According to the present invention, since the pitch angle θ1 of the magnetic head slider at the rotating speed of 2,000 rpm of the magnetic disk can be made effectively small, numerical ranges of the height and the position of the rod-like projection and so forth for setting the pitch angle θx can be relatively large, thereby providing an increased design freedom of a magnetic head slider that does not allow the magnetic element to come into contact with the surface of the magnetic disk during levitation.

DESCRIPTION OF THE PREFERRED EMBODIMENTS

Figure 1:
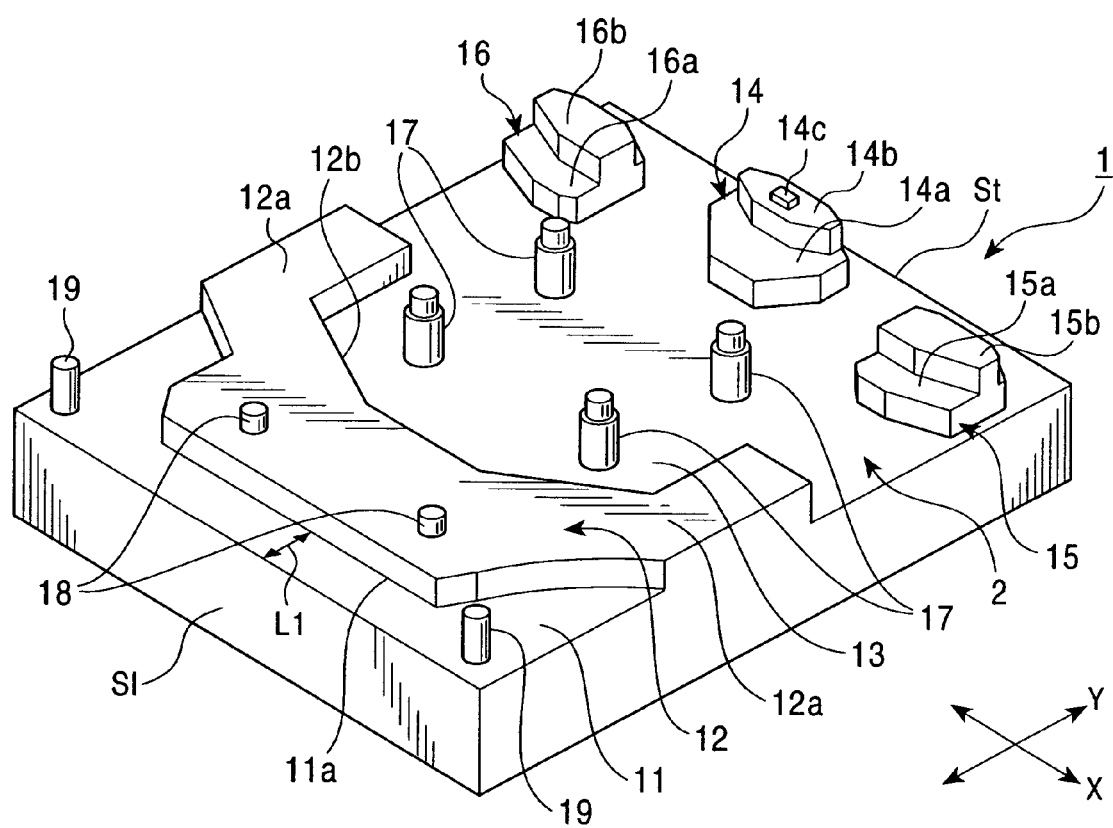
FIG. 1 is a perspective view of a magnetic head slider according to an embodiment of the present invention, in which the magnetic head slider is inverted to illustrate its disk-facing surface.

FIG. 1 is a perspective view of a magnetic head slider 1 according to an embodiment of the present invention, illustrating a disk-facing surface 2 of the magnetic head slider.

Figure 2:
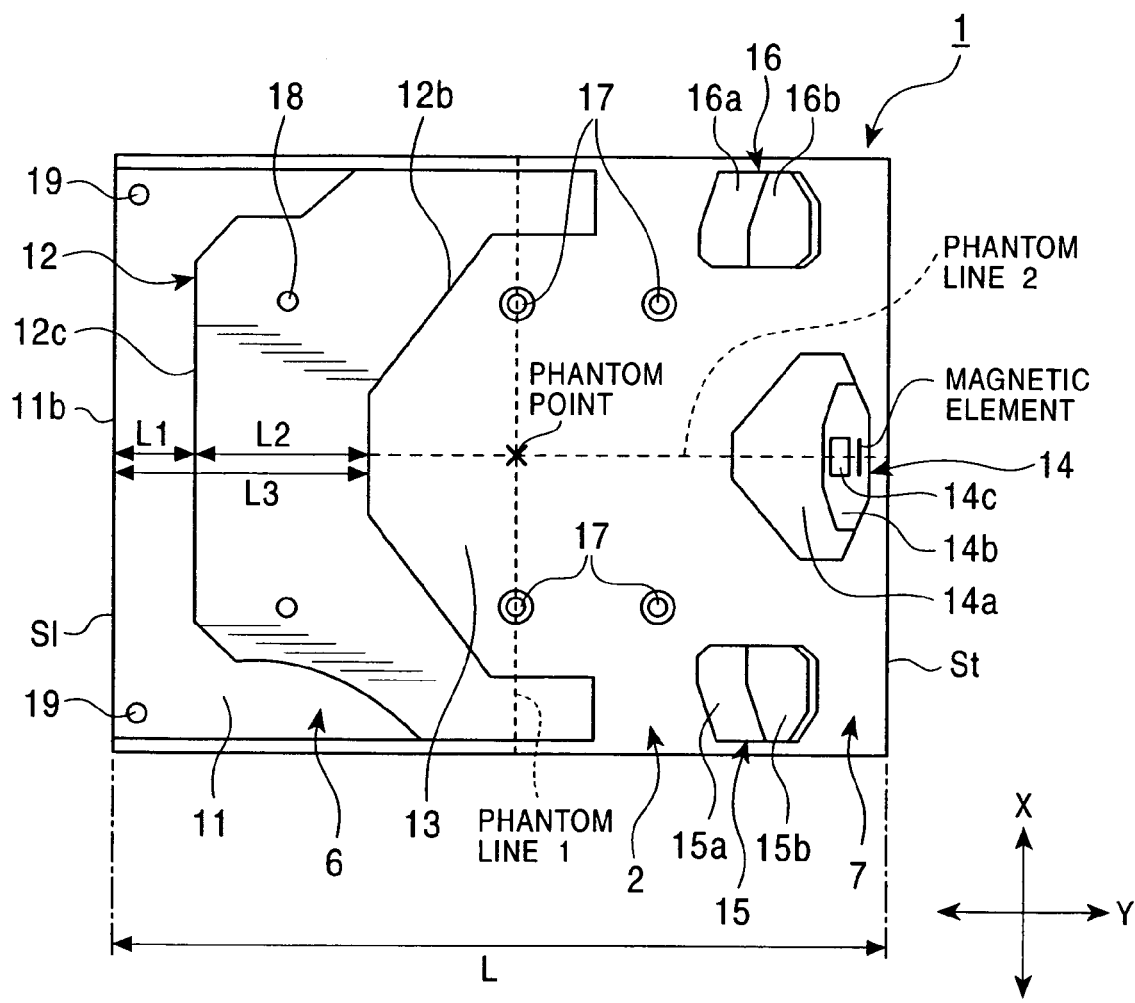
FIG. 2 is a plan view of the magnetic head slider shown in FIG. 1, illustrating the disk-facing surface.

FIG. 2 is a plan view of the magnetic head slider 1 shown in FIG. 1, viewed from the disk-facing surface 2.

Figure 10:
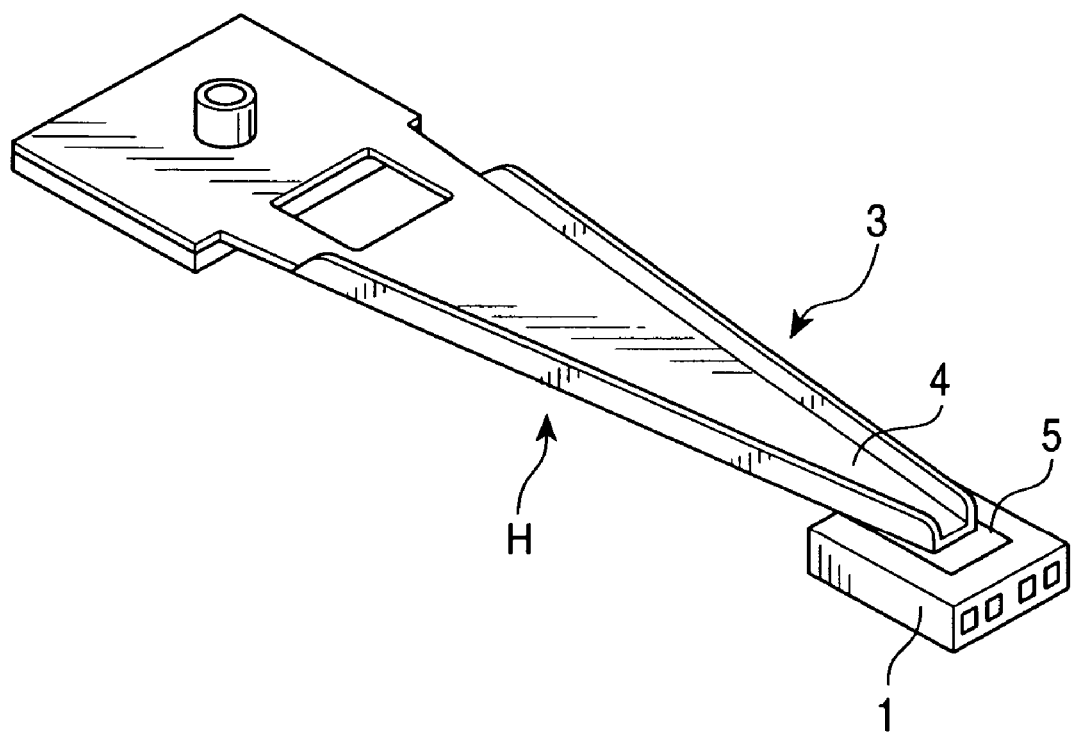
FIG. 10 is a partial perspective view of a magnetic head apparatus.

The magnetic head slider 1 shown in FIGS. 1 and 2 serves as a part of a magnetic head apparatus H. The magnetic head slider 1 is fixed to a supporting member 3 elastically supporting the magnetic head slider 1 from the opposite side of the disk-facing surface 2, for example, as shown in FIG. 10. The supporting member 3 is formed by a leaf-spring load beam 4 and a thin leaf-spring flexure (an elastic supporting member) 5 disposed at the top thereof.

The magnetic head apparatus H is installed in a magnetic disk apparatus so as to record a magnetic signal into a magnetic disk D installed in the magnetic disk apparatus and/or to play back a magnetic signal recorded in the magnetic disk D.

Figure 5:
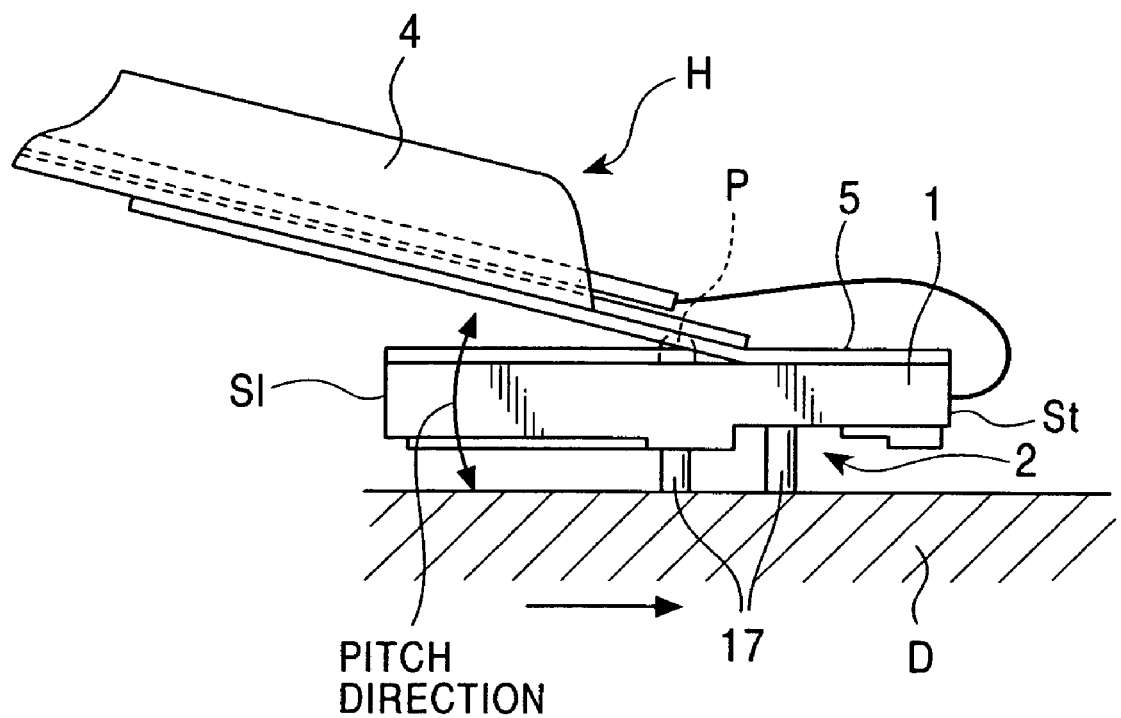
FIG. 5 is a partial side view of a magnetic disk apparatus, illustrating a state in which the magnetic head slider according to the present invention is stationary on a magnetic disk.

FIG. 5 illustrates a state in which the magnetic head slider 1 serving as a part of the magnetic head apparatus H is at a halt on the magnetic disk D disposed in the magnetic disk apparatus. As will be described later, when the magnetic disk D starts to rotate from the halt state shown in FIG. 5, the magnetic head slider 1 is levitated above the magnetic disk D so as to perform the above-mentioned read and/or write operation.

As shown in FIG. 5, the magnetic head slider 1 is fixed by adhesion to the lower surface of the flexure 5 from the opposite side of the disk-facing surface 2. Also, as shown in FIG. 5, the flexure 5 has, for example, a spherical pivot P protruding upward in the figure, and the top of the pivot P lies in contact with the load beam 4.

In the state shown in FIG. 5, the magnetic head slider 1 is urged against the recording surface of the magnetic disk D with a weak elastic force of the supporting member 3. Since the magnetic head slider 1 is subjected to airflow when the magnetic disk D starts to rotate, the magnetic head slider 1 is raised upward with the pivot P as a pivotal fulcrum while a leading-side end surface S1 thereof is raised more upward. During levitation above the magnetic disk D, the magnetic head slider 1 pivots in the pitch direction with the pivot P as a pivotal fulcrum so as to follow undulations of the surface of the magnetic disk.

The position of the pivot P viewed from the disk-facing surface 2 is illustrated by the x mark as a "phantom point" in FIG. 2. The phantom point is opposed to the apex of the pivot P in the thickness direction of the magnetic head slider 1.

As shown in FIG. 2, end surfaces of the magnetic head slider 1 on the left and right in the figure is respectively called "a leading-side end surface S1" and "a trailing-side end surface St".

Figure 3:
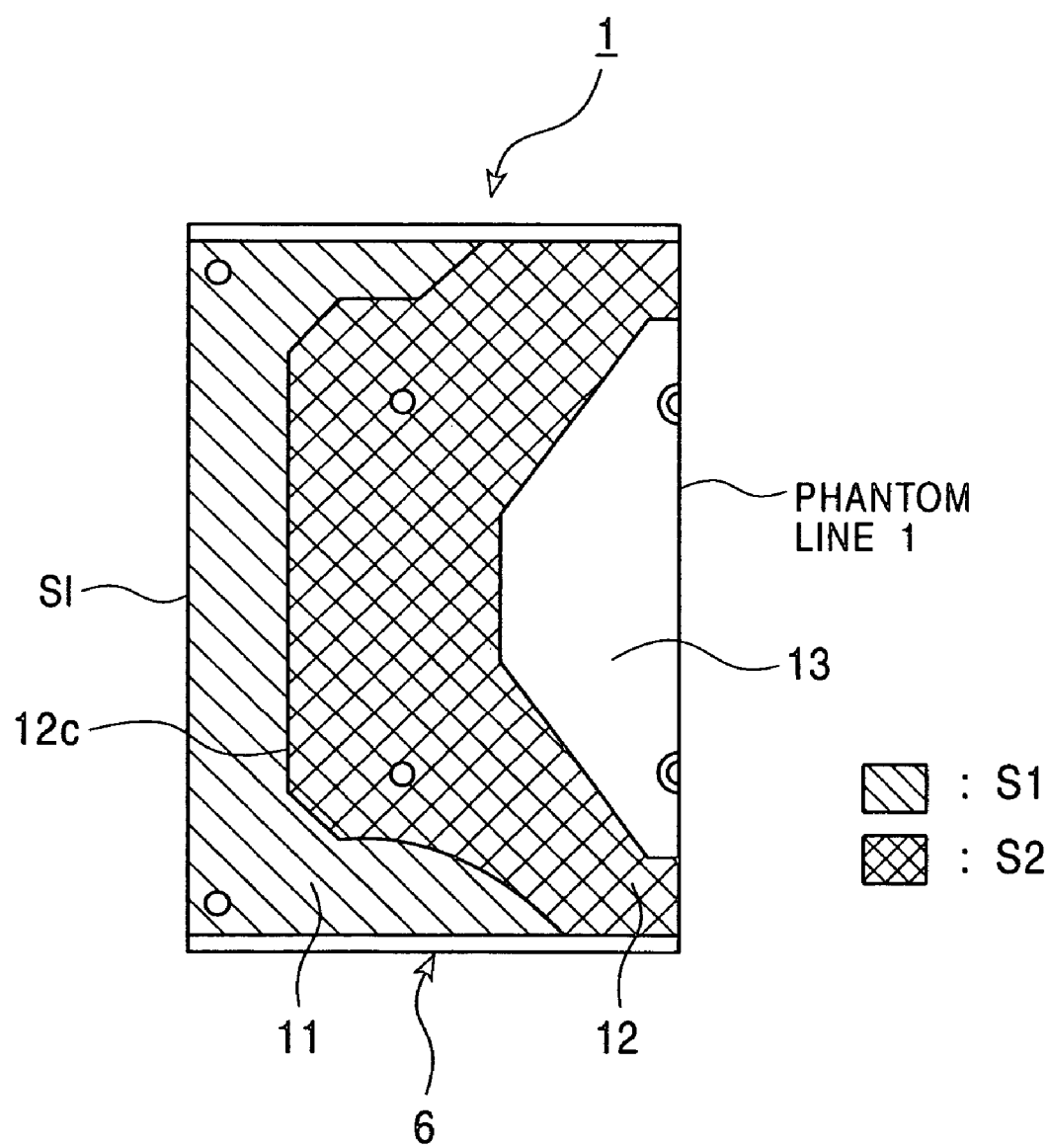
FIG. 3 is a partial plan view illustrating only a front half region of the disk-facing surface shown in FIG. 2.

FIG. 3 is a partial plan view illustrating a front half region 6 of the disk-facing surface 2, extending from the leading-side end surface S1 of the magnetic head slider 1 to a phantom line 1 drawn so as to be parallel to the leading-side end surface S1 (or the trailing-side end surface St) of the magnetic head slider 1 (i.e., in the X direction indicated in FIG. 2) and to pass through the phantom point.

The magnetic head slider 1 shown in FIGS. 1 and 2 is composed of an alumina-titanium carbide or the like.

As shown in FIGS. 1 and 2, the magnetic head slider 1 has a step surface 11, a positive-pressure generating surface 12, and an indented surface 13 formed in the disk-facing surface 2 thereof from the leading-side end surface S1 toward the trailing-side end surface St in that order. When attention is directed only toward the front half region 6 of the magnetic head slider 1 shown in FIG. 3, all the above surfaces appear in the front half region 6.

As shown in FIG. 1, the step surface 11 close to the leading-side end surface S1 is formed so as to extend lower than the positive-pressure generating surface 12 and also higher than the indented surface 13. In other words, with respect to the height direction, the step surface 11 extends between the positive-pressure generating surface 12 and the indented surface 13. As shown in FIG. 1, the step surface 11 is defined so as to have a predetermined shape in the following manner. That is, the step surface 11 extends in the width direction (in the X direction indicated in the figure) over the leading-side end surface S1 and also extends in the longitudinal direction (in the Y direction indicated in the figure) toward the trailing-side end surface St so as to have a length L1 at the central portion thereof with respect to the width direction. The extent of step surface 11 in the width direction is shorter in the central position than on both sides of the central position. Also, the positive-pressure generating surface 12 is formed from a trailing-side edge 11a of the step surface 11 so as to extend higher by one step than the step surface 11.

The positive-pressure generating surface 12 has two arms 12a extending along both sides of magnetic head slider 1 with respect to the width direction (the X direction indicated in the figure) toward the trailing-side end surface St. The indented surface 13 is lower than the step surface 11 and extends from a trailing-side edge 12b of the positive-pressure generating surface 12 toward the trailing-side end surface St.

For example, the step surface 11 is formed so as to extend higher than the indented surface 13 by 1.0 μm to 2.5 μm, and the positive-pressure generating surface 12 is formed so as to extend higher that the indented surface 13 by 1.1 μm to 2.7 μm.

As shown in FIG. 2, the indented surface 13 is formed so as to make up the major proportion of a rear half region 7 of the disk-facing surface 2 extending from the phantom line 1 to the trailing-side end surface St.

As shown in FIG. 2, the indented surface 13 has a magnetic-element-forming surface 14 formed thereon in a protruding manner and close to the trailing-side end surface St of the rear half region 7, and the magnetic-element-forming surface 14 has a disk-facing surface of a magnetic element disposed thereon.

The magnetic-element-forming surface 14 has a trailing-side step surface 14a extending as high as the step surface 11 and a trailing-side positive-pressure generating surface 14b extending from the trailing-side step surface 14a so as to be as high as the positive-pressure generating surface 12, both formed thereon in a protruding manner. The trailing-side positive-pressure generating surface 14b has a projection 14c formed thereon in a protruding manner and also has the disk-facing surface of the magnetic element disposed on a portion thereof lying closer to the trailing side than the projection 14c.

The magnetic element is one of a playback magnetoresistive (MR) element represented by, for example, a spin-valve thin-film element utilizing a magnetoresistive effect, or a recording inductive element, or a combination of both a spin-valve thin-film element and a recording inductive element.

As shown in FIG. 2, the indented surface 13 has side surfaces 15 and 16 formed thereon in a protruding manner and close to both sides, with respect to the width direction, of the rear half region 7. The side surfaces 15 and 16 are, respectively, formed by side step surfaces 15a and 16a extending as high as the step surface 11 and side positive-pressure surfaces 15b and 16b extending as high as the positive-pressure generating surface 12.

As shown in FIGS. 1 and 2, the indented surface 13 has four rod-like projections 17 formed thereon. Each rod-like projection 17 is formed such that its upper surface extends higher than the positive-pressure generating surface 12.

Two of the rod-like projections 17 close to the leading-side end surface S1 are placed right on the phantom line 1 so as to be equally away from the phantom point in the width direction (in the X direction indicated in the figure). Also, the other two rod-like projections 17 close to the trailing-side end surface St lie on the rear half region 7 and are placed in the width direction (in the X direction indicated in the figure) so as to be equally away from a phantom line 2 which is drawn in the longitudinal direction (in the Y direction indicated in the figure) so as to pass through the phantom point.

Meanwhile, the rod-like projections 17 are not limited to being formed at the above-mentioned places. As shown in FIGS. 1 and 2, the positive-pressure generating surface 12 has two rod-like projections 18 formed thereon, and also, the step surface 11 has two rod-like projections 19 formed thereon. The rod-like projections 17, 18, and 19 are as tall as or taller than the projection 14c formed on the foregoing magnetic-element-forming surface 14.

Although each of the rod-like projections 17, 18, and 19 has a round shape when viewed from above as shown in FIG. 2, they are not limited to a round shape.

Characteristic aspects of the magnetic head slider according to the present invention will now be described.

As shown in FIG. 3, the magnetic head slider 1 has the step surface 11, the positive-pressure generating surface 12, and the indented surface 13 formed in the front half region 6 thereof sequentially formed from the leading-side end surface S1 toward the trailing-side end surface St in that order.

When the area of the overall front half region 6 arranged as described above is defined as S and the step surface 11, and the positive-pressure generating surface 12 are respectively defined as S1 (shown as an diagonally shaded area in FIG. 3) and S2 (shown as a diagonally cross-shaded area in FIG. 3), the area ratios S1/S and S1/S2 are respectively in ranges from about 0.180 to about 0.232 and from about 0.30 to about 0.47.

By setting the foregoing area ratios in the above-mentioned ranges, the following advantages can be expected. As already described, FIG. 5 shows a state in which the magnetic head slider 1 serving as a part of the magnetic head apparatus H is at a halt on the magnetic disk D. When the magnetic disk D starts to rotate in the direction indicated by the arrow in FIG. 5, air flows below the disk-facing surface 2 of the magnetic head slider 1 from the leading-side end surface S1 to the trailing-side end surface St.

When the air flows into the step surface 11 shown in FIG. 2 from the leading-side end surface S1 and then hits the leading-side edge 12c of the positive-pressure generating surface 12, the air is compressed so as to generate a positive pressure. Thus, as shown in FIG. 6, as the leading-side end surface S1 of the magnetic head slider 1 is raised upward from the magnetic disk D, the pivot P acts as a pivotal fulcrum.

Figure 6:
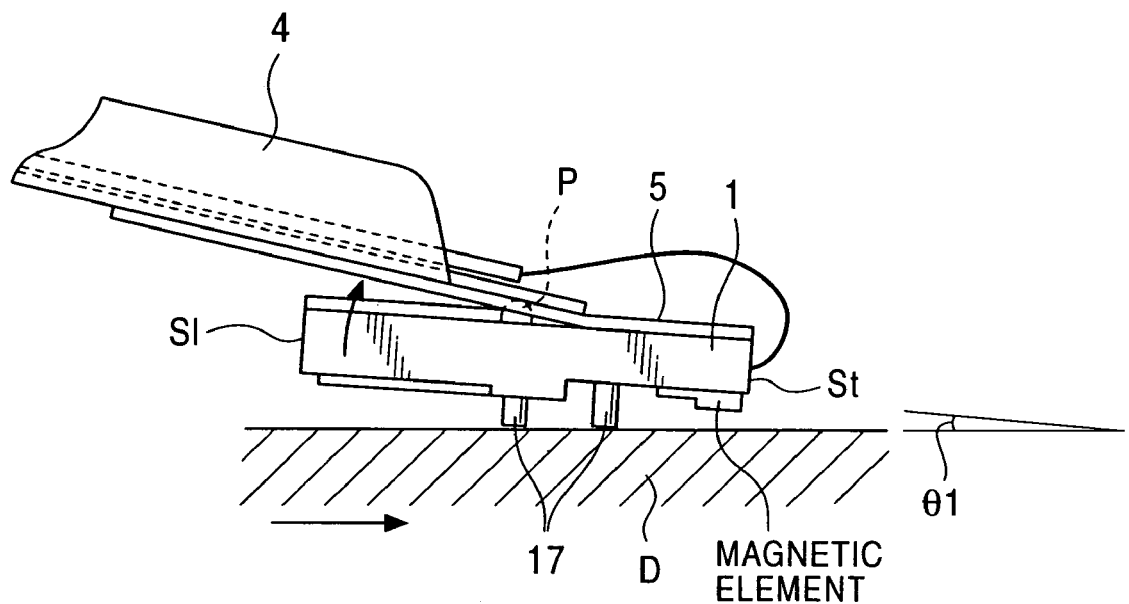
FIG. 6 is a partial side view of the magnetic disk apparatus shown in FIG. 5, illustrating a state at the moment when the magnetic head slider according to the present invention is just levitated from the magnetic disk.
Figure 7:
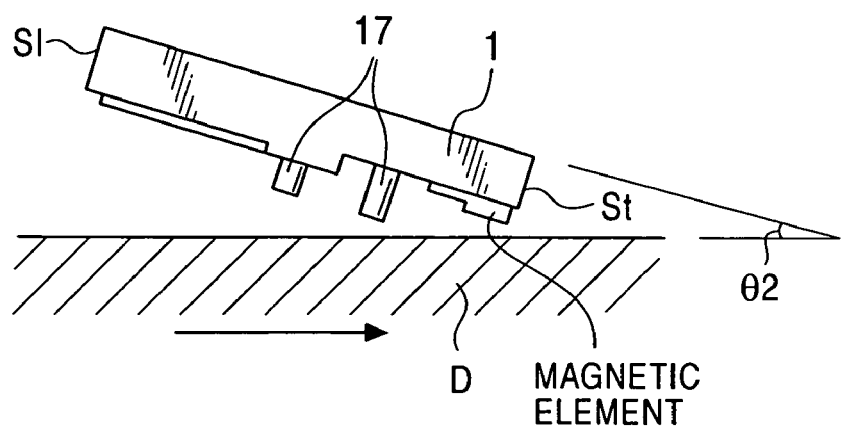
FIG. 7 is a partial side view of the magnetic disk apparatus shown in FIGS. 5 and 6, illustrating a state in which the magnetic head slider according to the present invention is levitated above the magnetic disk.
Figure 8:
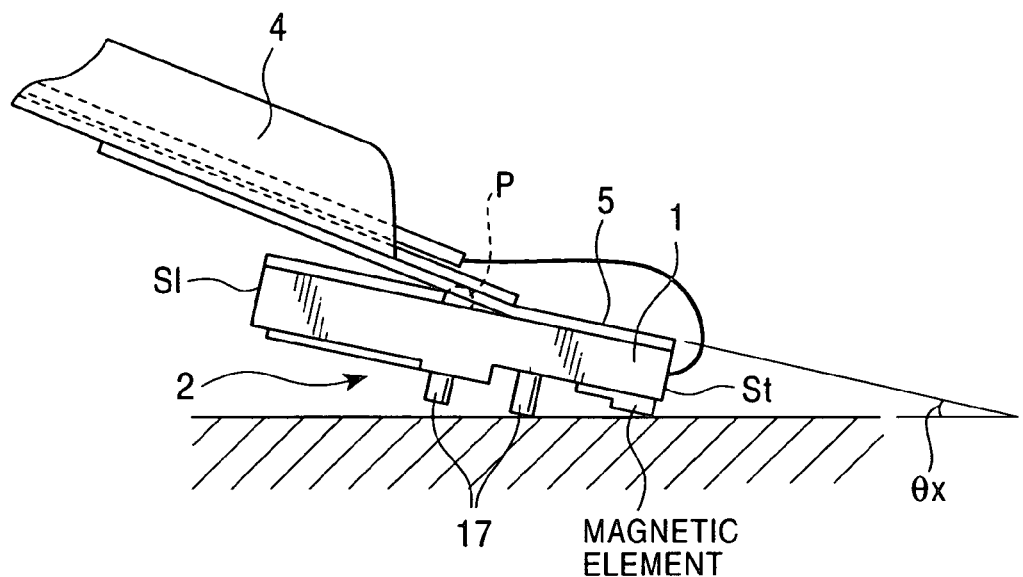
FIG. 8 is a partial side view of the magnetic disk apparatus shown in FIGS. 5–7, illustrating a state in which the magnetic element disposed in the magnetic head slider comes into contact with the surface of the magnetic disk.

Although a pitch angle is generally defined with the method illustrated in FIG. 9, which will subsequently be described, each of the pitch angles shown in FIGS. 6 to 8 is defined as an angle formed by the upper surface of the magnetic disk D and the supporting surface of the magnetic head slider 1 opposite to the disk-facing surface 2. When a pitch angle is defined as an angle formed by the supporting surface of the magnetic head slider 1 opposite to the disk-facing surface 2 and the upper surface of the magnetic disk D, it should be noted that the supporting surface of the magnetic head slider 1 must be parallel to a phantom line 5 illustrated in FIG. 9. The supporting surface shown in FIGS. 6 to 8 extends parallel to the phantom line 5.

FIG. 6 illustrates a state at the moment when the magnetic head slider 1 is just levitated from the magnetic disk D. At this moment of levitation, the pitch angle is θ1, and, at the pitch angle θ1, the magnetic element disposed close to the trailing-side end surface St of the magnetic head slider 1 is prevented from coming into contact with the surface of the magnetic disk D.

That is, according to the present invention, by setting the foregoing area ratios in the above-mentioned ranges, the pitch angle θ1, at the moment of the magnetic head slider 1 is just levitated, can be small and the magnetic element does not come into contact with the surface of the magnetic disk D.

FIG. 8 shows a pitch angle θx of the magnetic head slider 1 in a situation where the magnetic element comes into contact with the surface of the magnetic disk D. FIG. 8 illustrates a state in which the rod-like projections 17 formed on the disk-facing surface 2 of the magnetic head slider 1 closest to the trailing-side end surface St as well as the magnetic element contact the magnetic disk D. The pitch angle θ1 shown in FIG. 6 is smaller than the pitch angle θx shown in FIG. 8.

According to the present invention, at the moment when the magnetic head slider 1 is just levitated from the magnetic disk D as shown in FIG. 6, the magnetic element inclines at the pitch angle θ1 and the magnetic element is prevented from coming into contact with the surface of the magnetic disk D. When the magnetic head slider 1 is levitated above the magnetic disk D, as shown in FIG. 7 (in which the supporting member 3 is eliminated and only the geometrical relationship between the magnetic head slider 1 and the magnetic disk D is illustrated), and the magnetic disk D rotates at a higher speed, the magnetic head slider 1 has a levitation attitude with a large pitch angle θ2. The leading-side end surface S1 of the magnetic head slider 1 is raised more upward and also the trailing-side end surface St is lowered more downward. The magnetic element of the magnetic head slider 1 formed close to the trailing-side end surface St thus comes effectively closer toward the magnetic disk D, thereby achieving a smaller spacing.

As described above, according to the present invention, the pitch angle θ1 at the moment when the magnetic head slider 1 is just levitated from the magnetic disk D (at the instant of being just levitated) can be made smaller than the pitch angle θx (formed on the assumption that the magnetic element of the magnetic head slider 1 comes into contact with the surface of the magnetic disk D). Also, during levitation of the magnetic head slider 1, the magnetic head slider 1 has a greater pitch angle θ2, whereby a difference in the pitch angles (θ2−θ1) can be made large.

Also, according to the present invention, by setting the foregoing area ratios in the above-mentioned ranges, a difference in pitch angles of the magnetic head slider 1 under pressures at ground level (0 m above sea level) and at high attitude (for example, 10 kft (about 3 km) above sea level) can be made small. That is, according to the results of simulation experiments, which will subsequently be described, a large variance of the pitch angle of the magnetic head slider due to a pressure change can be prevented. Accordingly, a stable levitation attitude of the magnetic head slider 1 can be maintained at varying altitudes.

Accordingly, the stable levitation attitude can be maintained regardless of fluctuation in airflow above the magnetic disk D, and thus a variance of the distance (spacing) between the magnetic element and the magnetic disk D can be made small, thereby achieving stable recording and playback characteristics.

In order to allow the magnetic head slider 1 to have the large pitch angle θ2 with which the leading-side end surface S1 is raised more upward and the trailing-side end surface St is lowered more downward as shown in FIG. 7 during levitation of the magnetic head slider 1 above the magnetic disk D, not only the area ratios of the positive-pressure generating surface 12 and the step surface 11 making up the front half region 6 of the magnetic head slider 1 need to be considered, but also adjustment of the area ratio and the shape of the indented surface 13 making up the rear half region 7 is important.

Air flowing below at least one portion of the indented surface 13 generates a negative pressure pressing the magnetic head slider 1 downward (toward the magnetic disk D). Accordingly, when the indented surface 13 is larger in the rear half region 7 than in the front half region 6, the trailing-side end surface St of the magnetic head slider 1 is likely to be declined downward, thereby making the pitch angle θ2 greater. Also, it is preferable that the indented surface 13 be formed so as to extend continuously from the trailing-side edge 12b of the positive-pressure generating surface 12 to both sides of the magnetic-element-forming surface 14 with respect to the width direction (the X direction) and to have portions on both sides of the magnetic-element-forming surface 14 extending toward the trailing-side end surface St, as shown in FIGS. 1 and 2. With this structure, a strong positive pressure is unlikely to be generated below the rear half region 7 of the magnetic head slider 1, and the trailing-side end surface St of the magnetic head slider 1 is thus likely to be declined downward, thereby making the pitch angle θ2 shown in FIG. 7 greater.

The pitch angle θ2 is preferably not smaller than the pitch angle θx shown in FIG. 8 in order to reduce a spacing loss. Also, when the magnetic head slider 1 lies in the state shown in FIG. 7, the rod-like projections 17 are prevented from sliding or intermittently coming into contact with the surface of the magnetic disk D, thereby preventing the surface of magnetic disk D from being damaged and achieving a stable levitation attitude of the magnetic head slider 1.

Also, the area ratio of the indented surface 13 to the rear half region 7 is preferably not greater than 80%.

According to the results of the simulation experiments, which will subsequently be described, when the overall length of the magnetic head slider 1 shown in FIG. 2 in the longitudinal direction (in the Y direction indicated in the figure) and the length of a part of the step surface 11 extending along the phantom line 2 are respectively defined as L and L1, the length ratio L1/L is preferably in a range from about 0.0240 to about 0.065.

By setting the length ratio L1/L as well as the area ratios S1/S and S1/S2 in the above-mentioned ranges, a difference in pitch angles of the magnetic head slider 1 at the moment when it is just levitated (shown in FIG. 6) and during levitation (shown in FIG. 7) can be made effectively greater. Also, a variation of the pitch angle of the same due to a pressure change can be reduced.

Also, as shown in FIG. 2, when the length of a part of the positive-pressure generating surface 12 extending along the phantom line 2 is defined as L2 and the sum of the lengths L1 and L2 is defined as L3, by setting the length ratios L1/L3 and L2/L3 in ranges from about 0.070 to about 0.250 and from about 0.8 to about 0.935, respectively, a difference in pitch angles of the magnetic head slider 1 at the moment when it is just levitated (shown in FIG. 6) and during levitation (shown in FIG. 7) can effectively be made much greater. In addition, a variation of the pitch angle due to a pressure change can be reduced.

Also, according to the present invention, as shown in FIGS. 1 and 2, the magnetic head slider 1 has the rod-like projections 17, 18, and 19 and the projection 14c formed on the disk-facing surface 2 thereof such that the upper surfaces of these projections extend higher than the positive-pressure generating surface 12 in order to prevent the magnetic element disposed close to the trail side surface St from coming into contact with the surface of the magnetic disk D even when the magnetic head slider 1 declines. Preferably, at least one of the rod-like projections is disposed in the rear half region 7 in order to prevent the magnetic element from coming into contact with the surface of the magnetic disk D.

Also, as described above, according to the present invention, the pitch angle θ1 of the magnetic head slider 1 at the moment when it is just levitated is smaller than the pitch angle θx (where it is assumed that the magnetic element and at least one of the rod-like projections 17 come into contact with the surface of the magnetic disk D, as shown in FIG. 8), thereby preventing the magnetic element from coming into contact with the surface of the magnetic disk D. Correspondingly, the pitch angle θx varies, as a matter of course, in accordance with the height and the position of each rod-like projection and the position a crown shape formed on the disk-facing surface 2.

According to the results of simulation experiments using the area ratios described with reference FIG. 3 and as described above, the pitch angle of the magnetic head slider 1 having the area ratios in the ranges described above at the moment when it is just levitated from the magnetic disk D (at the rotating speed 2,000 rpm of the magnetic disk) is in a range from 175 μradians to 206 μradians. Thus, by setting the height and the position of each rod-like projection so as to make the pitch angle θx not less than 210 μradians, the magnetic element can be prevented from coming into contact with the magnetic disk D during levitation of the magnetic head slider 1.

According to the present invention, since the pitch angle θ1 of the magnetic head slider at the rotating speed of 2,000 rpm of the magnetic disk can effectively have a range from about 175 μradians to about 206 μradians, numerical ranges of, for example, the height and the position of each rod-like projection for setting the pitch angle θx can be enlarged. The enlarged pitch angle θx provides increased design freedom for a magnetic head slider that will not allow the magnetic element to come into contact with the surface of the magnetic disk during levitation.

The present invention is not limited to the shape of the disk-facing surface 2 of the magnetic head slider 1 shown in FIGS. 1 and 2. The above shape is sufficient as long as the front half region 6 has the step surface 11, the positive-pressure generating surface 12, and the indented surface 13 formed therein from the leading-side end surface S1 toward the trailing-side end surface St in that order as described above, and the area ratios S1/S and S1/S2 are in the above-mentioned ranges.

Figure 4:
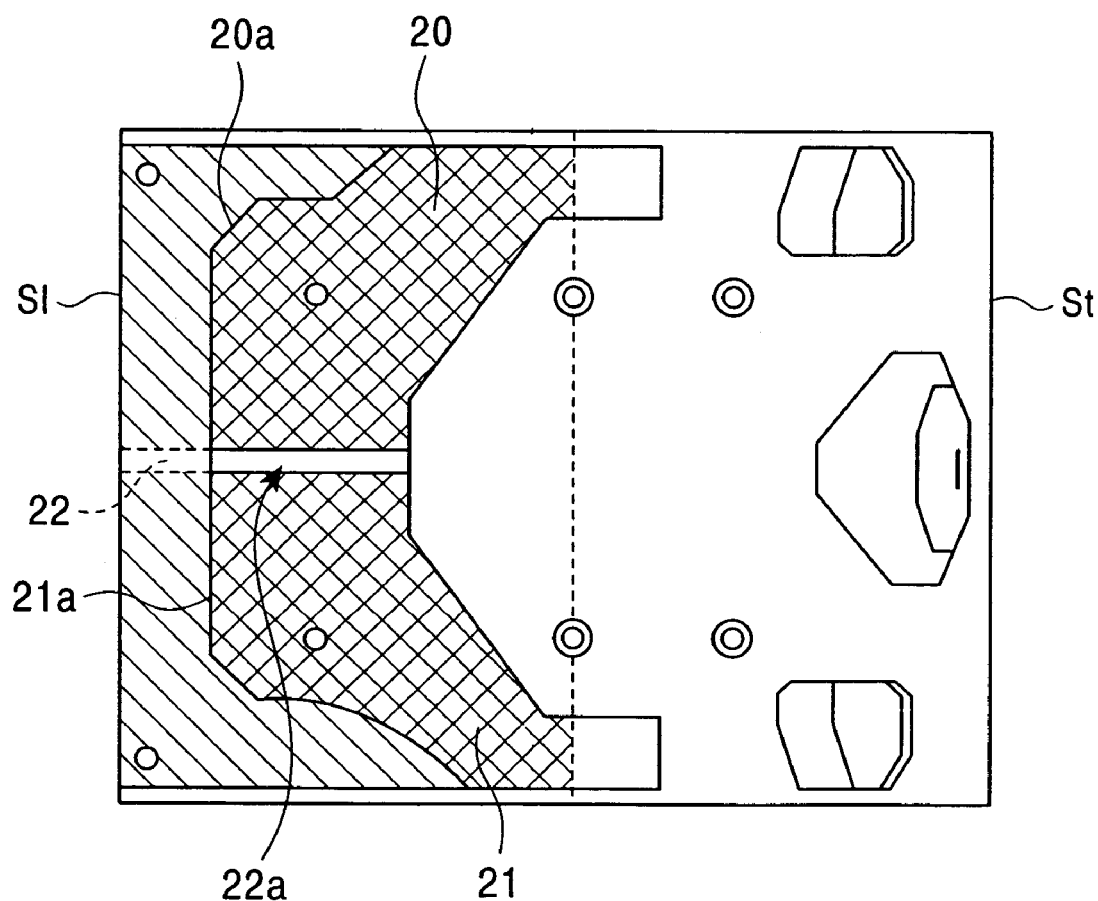
FIG. 4 is a plan view of a magnetic head slider according to another embodiment of the present invention, illustrating the disk-facing surface.

For example, a plan view of a magnetic head slider according to another embodiment of the present invention, viewed from its disk-facing surface is illustrated in FIG. 4. The disk-facing surface may have a shape in which the front half region 6 has a step surface 22, positive-pressure generating surfaces 20 and 21 divided into two parts in the width direction, and a step surface 22a interposed between the positive-pressure generating surfaces 20 and 21 and formed integrally with the step surface 22 and closer to the leading-side end surface S1 than the positive-pressure generating surfaces 20 and 21.

In such a case, it should be noted that the area S1 of the step surface 22 is determined by the shaded portion indicated in the figure extending from the leading-side end surface S1 to leading-side edges 20a and 21a of the positive-pressure generating surfaces 20 and 21. The step surface 22 does not include the step surface 22a between the positive-pressure generating surfaces 20 and 21 and a portion of the step surface 22 extending from the leading-side end surface S1 to the step surface 22a.

Finally, the definition of a pitch angle will be described with reference to FIG. 9. FIG. 9 illustrates a state in which the magnetic head slider 1 is levitated above the magnetic disk D. The positive-pressure generating surface of the magnetic head slider 1 shown in FIG. 9 has a so-called curved crown shape. FIG. 9 is a sectional shape of the magnetic head slider 1 viewed by cutting it along the thickness direction thereof. Although the cross section is merely illustrated here for the sake of convenience, it is not needed to cut the magnetic head slider for actual measurement. It is a matter of course that the following pitch angle can be measured from the side surface of the magnetic head slider.

Figure 9:
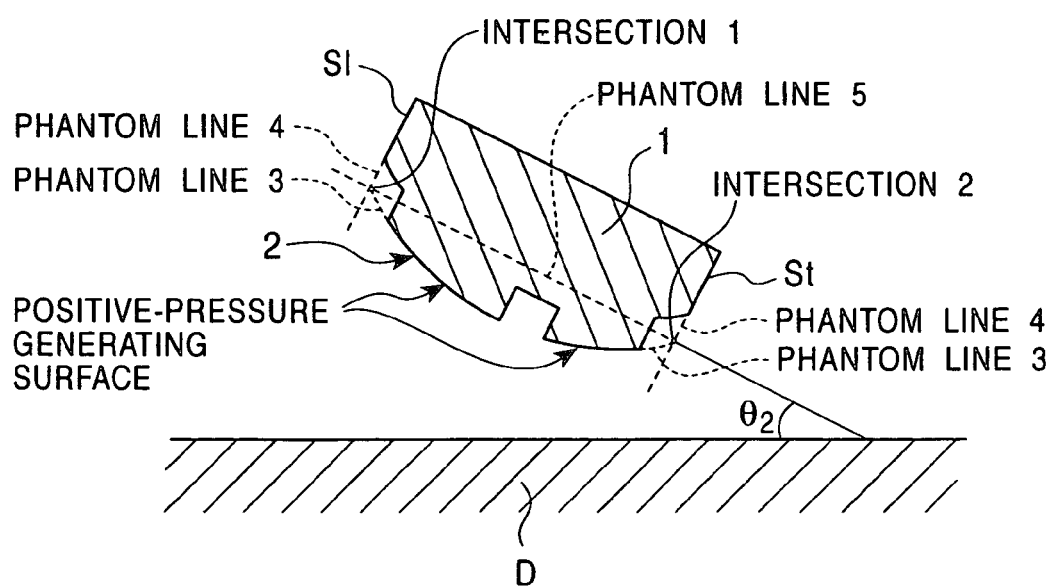
FIG. 9 is a cross-sectional illustration of a magnetic head slider for defining a pitch angle.

On the basis of the radius of curvature of the positive-pressure generating surface appearing in the cross section shown in FIG. 9, two approximate curves of the second order are drawn in a plane parallel to the cross section, outwards from both ends of the profile line of the positive-pressure generating surface as phantom lines 3.

Then, two phantom lines 4 are drawn in the plane parallel to the cross section, from the trailing-side end surface St and the leading-side end surface S1 of the magnetic head slider 1 so as to extend toward the magnetic disk D. Thus, an angle formed by the magnetic disk D and the phantom line 5 linearly connecting intersections 1 and 2 phantom lines 3 and 4 is defined as the pitch angle θ2.

If the pitch angle θ2 is defined as described above, the pitch angle θ1 and the pitch angle θx must be also defined in the same fashion as the pitch angle θ2.

EXAMPLES

Figure 11:
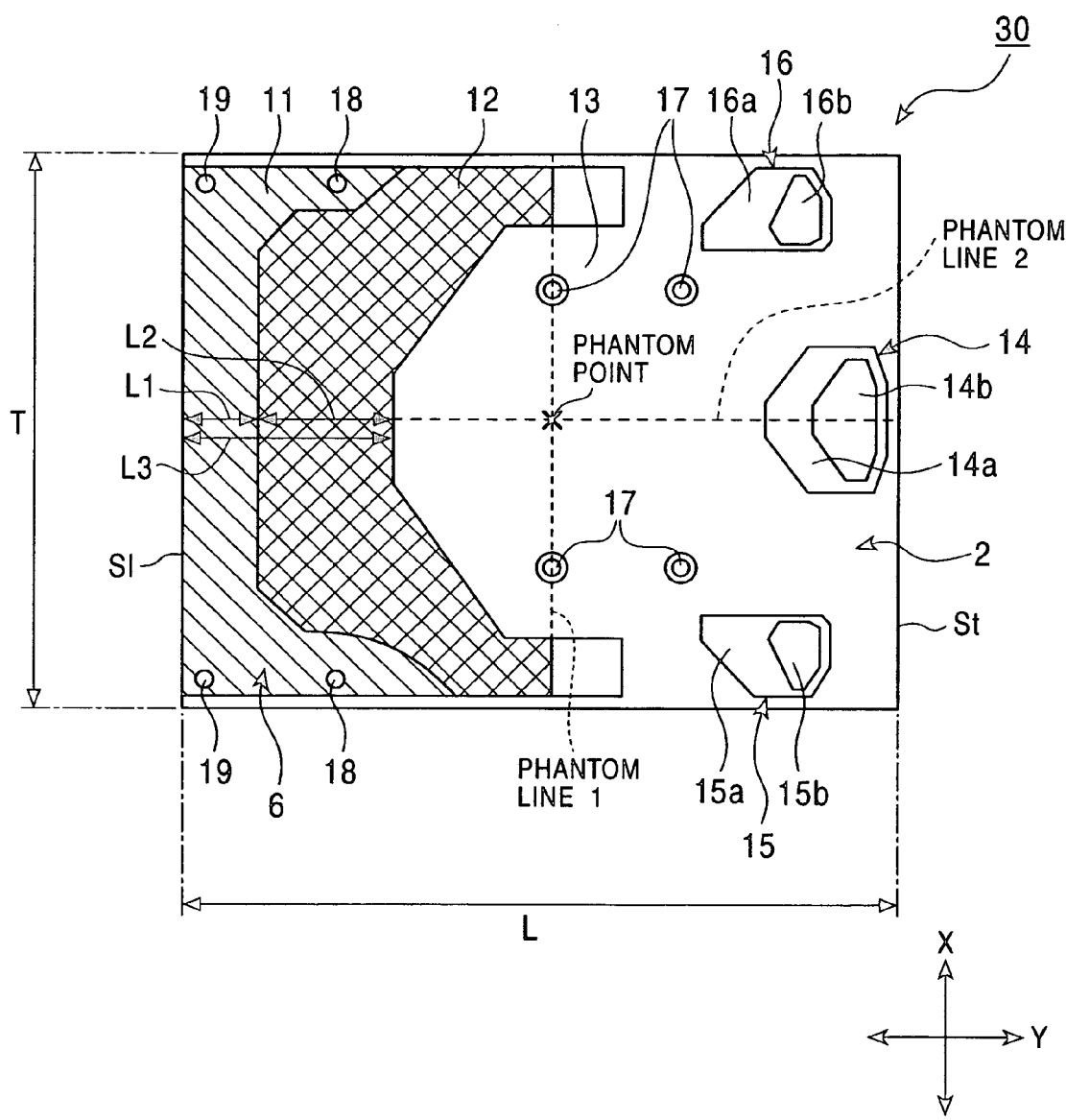
FIG. 11 is a partial plan view of a magnetic head slider used in simulation experiments, illustrating its disk-facing surface.

In the present invention, the following simulation experiments were conducted by using a magnetic head slider 30 shown in FIG. 11, which is a plan view of the magnetic head slider 30, illustrating the upturned disk-facing surface 2. Surfaces denoted by the same reference numbers of the magnetic head slider 1 shown in FIGS. 1 and 2 indicate the same surfaces as those of the magnetic head slider 1.

The magnetic head slider 30 shown in FIG. 11 is closely similar to the magnetic head slider 1 shown in FIG. 2. In particular, the step surface 11, the positive-pressure generating surface 12, and the indented surface 13 formed in the front half region 6 extending between the leading-side end surface S1 and the phantom line 1 which is drawn in the width direction (in the X direction indicated in the figure) so as to pass through the phantom point have the same shapes in FIGS. 2 and 11.

The simulation experiments were carried out to determine the difference in pitch angles of the magnetic head slider 30 at the moment when it is just levitated from the magnetic disk and during levitation above the magnetic disk with respect to the area ratio S1/S and S1/S2 at varying air pressure and disk rotating speeds. The area ratio S1/S corresponds to the area S1 of the step surface 11 in the front half region 6 to the area S of the overall front half region 6. The area ratio S1/S2 corresponds to the area S1 of the step surface 11 to the area S2 of the positive-pressure generating surface 12 in the front half region 6. In the experiments, the length L of the magnetic head slider 30 shown in FIG. 11 extending from the leading-side end surface S1 to the trailing-side end surface St and the width T of the same were respectively fixed at 1.241 mm and 1.000 mm.

In the experiments, the lengths L1 and L2 of the corresponding parts of the step surface 11 and the positive-pressure generating surface 12 extending along the phantom line 2 which is drawn in the longitudinal direction so as to pass through the phantom point shown in FIG. 11 were changed so as to change the above areas S, S1, and S2 of the magnetic head slider 30 used in the experiments. Thus, seven different magnetic head sliders were obtained as shown in Table 1.

rpm of the magnetic disk is relatively large, and also a difference in the pitch angles under pressures at ground level (0 m above sea level) and at high attitude (10 kft (about 3 km) above sea level) is relatively small.

Figure 12:
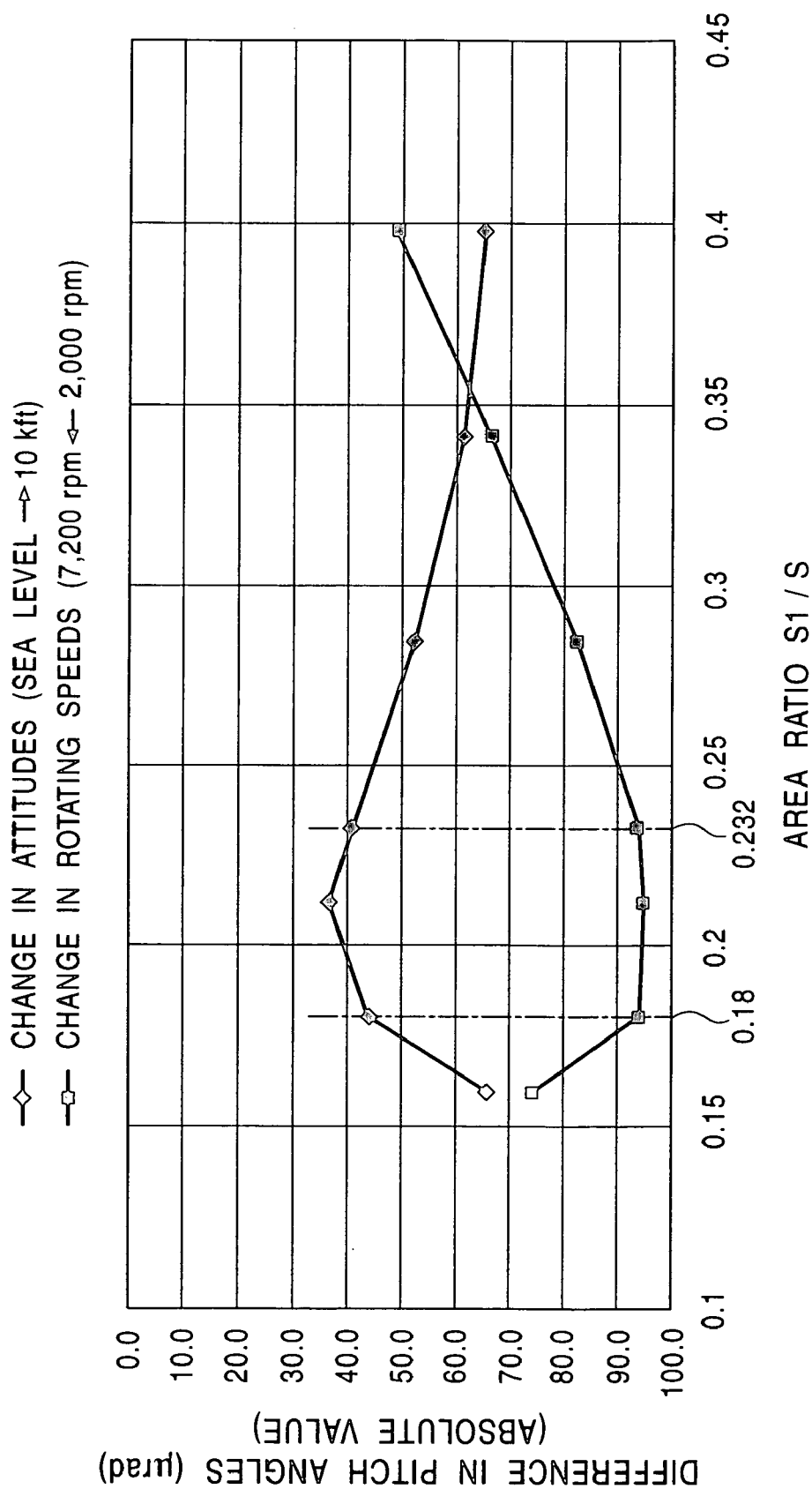
FIG. 12 is a graph illustrating the relationship between area ratio S1/S and differences in pitch angles of a magnetic head slider in accordance with an embodiment of the invention at the rotating speeds of 2,000 rpm and 7,200 rpm of the magnetic disk as well as in pitch angles of the magnetic head slider under pressures at high attitude (10 kft (about 3 km) above sea level) and at ground level (0 m above sea level)
Figure 13:
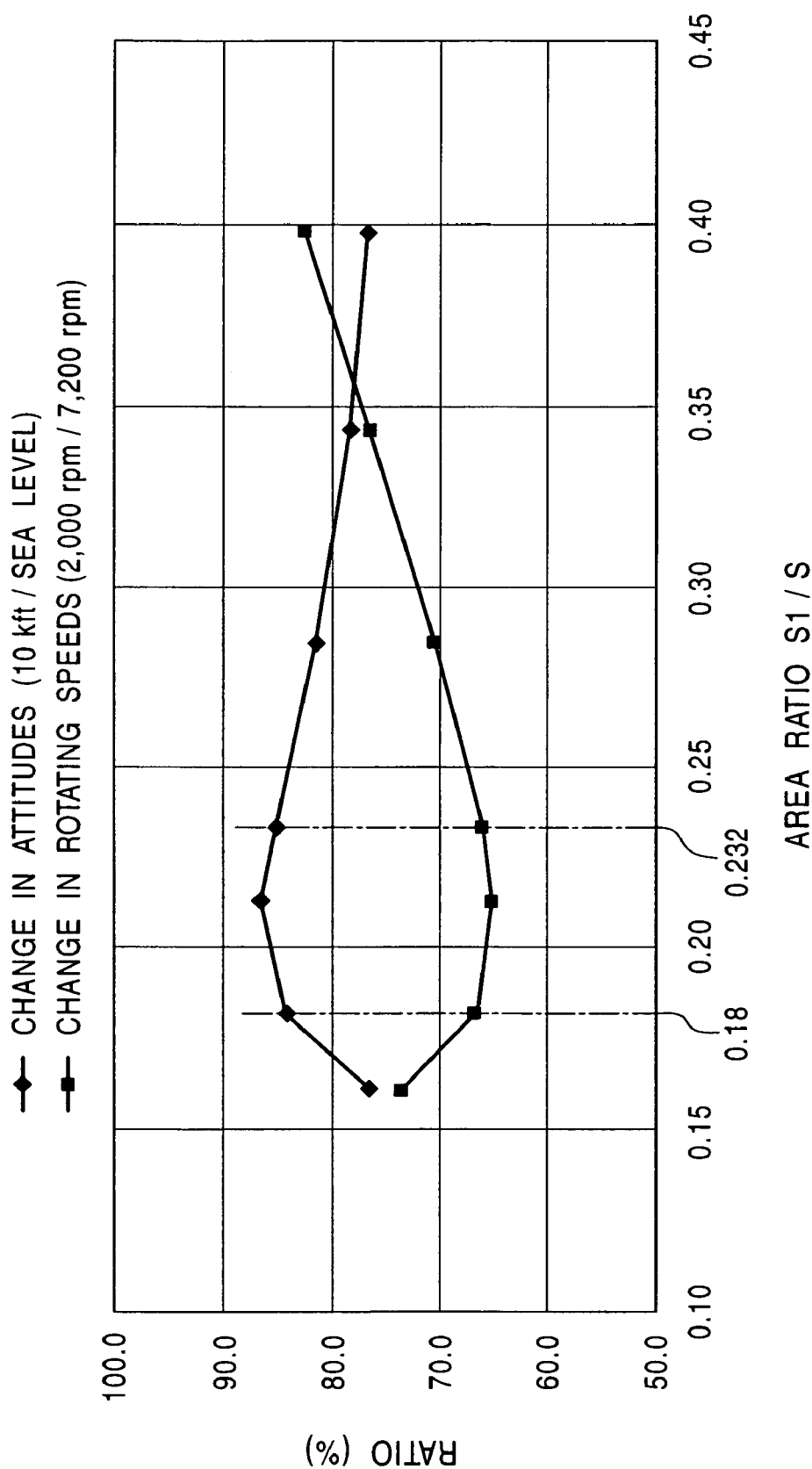
FIG. 13 is a graph illustrating the relationship between area ratio S1/S and ratios of the mutually corresponding pitch angles used for computing the differences shown in FIG. 12.

FIG. 13 is a graph illustrating the relationship between area ratio S1/S and ratios of the mutually corresponding pitch angles used for computing the differences shown in FIG. 12. As seen from FIG. 13, the same relative results are obtained as those in FIG. 12.

Figure 14:
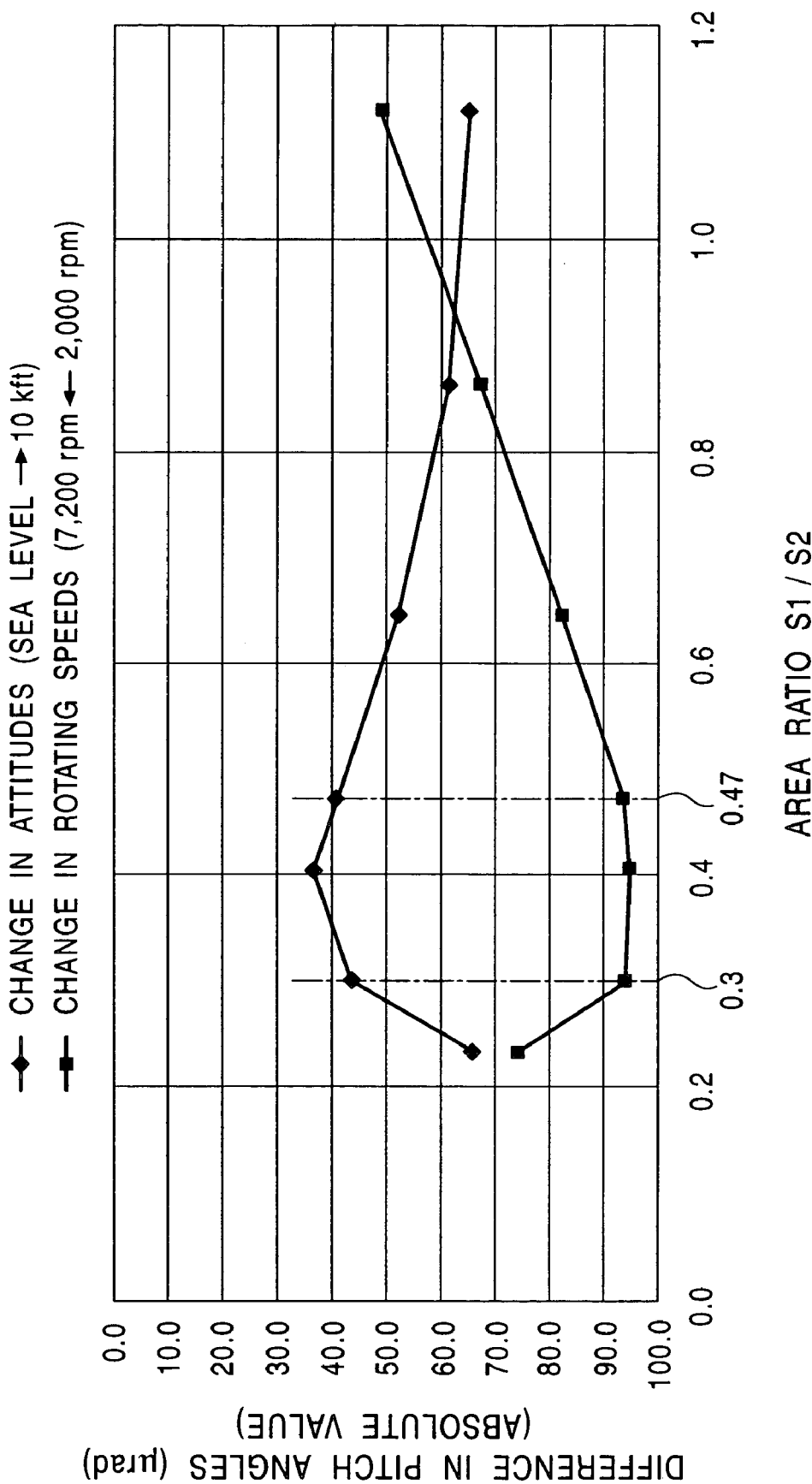
FIG. 14 is a graph illustrating the relationship between area ratio S1/S2 and differences in pitch angles of a magnetic head slider in accordance with an embodiment of the invention at the rotating speeds of 2,000 rpm and 7,200 rpm of the magnetic disk as well as in pitch angles of the magnetic head slider under pressures at high attitude (10 kft (about 3 km) above sea level) and at ground level (0 m above sea level)

FIG. 14 is a graph illustrating the results of the simulation experiments with respect to variation in the area ratio S1/S2. As seen from FIG. 14, when the area ratio S1/S2 is in a range from about 0.30 to about 0.47, a difference in the pitch angles at the rotating speeds of 7,200 rpm and 2,000 rpm of the magnetic disk is relatively large, and also a difference in

TABLE 1

| L1 (mm) | 0.01 | 0.03 | 0.06 | 0.08 | 0.13 | 0.18 | 0.23 |
|---|---|---|---|---|---|---|---|
| L2 (mm) | 0.53 | 0.46 | 0.39 | 0.4 | 0.38 | 0.4 | 0.42 |
| L3 (mm) | 0.52 | 0.43 | 0.33 | 0.32 | 0.25 | 0.22 | 0.19 |
| L1/L3 | 0.0192308 | 0.067674 | 0.1818182 | 0.25 | 0.52 | 0.8181818 | 1.2105263 |
| L2/L3 | 0.9811321 | 0.9347826 | 0.8461538 | 0.8 | 0.6578947 | 0.55 | 0.452381 |
| L1/L | 0.008058 | 0.0241741 | 0.0483481 | 0.0644641 | 0.1047542 | 0.1450443 | 0.1853344 |
| S1 (mm2) | 0.098972 | 0.111872 | 0.131222 | 0.144122 | 0.176372 | 0.212372 | 0.246872 |
| S2 (mm2) | 0.417825 | 0.37325 | 0.322225 | 0.3048 | 0.27255 | 0.2456 | 0.22015 |
| S1/S2 | 0.2368743 | 0.299724 | 0.4072372 | 0.4728412 | 0.647118 | 0.8647068 | 1.1213809 |
| S1/S | 0.1596323 | 0.1804387 | 0.2116484 | 0.2324548 | 0.284471 | 0.3425355 | 0.3981806 |

Although the rotating speed of the magnetic disk was increased up to 7,200 rpm in the simulation experiments, the simulation experiments were also conducted by changing various characteristics, such as an elastic force of the supporting member 3 so as to make the distance (spacing) between the magnetic element and the magnetic disk D and also the pitch angle 10 nm and 280 μradians, respectively, at the rotating speed of 7,200 rpm regardless of the simulation experiments.

In carrying out the experiments, first, the magnetic disk was rotated, and a difference in pitch angles of the magnetic head slider 30 on the assumption that the magnetic head slider was levitated at the rotating speed of 2,000 rpm of the magnetic disk and at the increased high rotating speed of 7,200 rpm of the magnetic disk was obtained with respect to the area ratio S1/S.

Also, at a rotating speed of 7,200 rpm of the magnetic disk, a difference in pitch angle of the magnetic head slider 30 under pressures at ground level (0 m above sea level) and at high attitude (10 kft (about 3 km) above sea level) was obtained with respect to the area ratio S1/S.

In addition, the simulation experiments with respect to the area ratio S1/S2 were conducted in the same fashion as described above.

FIG. 12 is a graph illustrating the results of the simulation experiments with respect to variation in the area ratio S1/S. The vertical axis shows the difference in pitch angles of the magnetic head slider 30 at the rotating speeds of 2,000 rpm and 7,200 rpm of the magnetic disk. The vertical axis also shows the difference in pitch angles of the magnetic head slider 30 at the rotating speed of 7,200 rpm of the magnetic disk under pressures at ground level (0 m above sea level) and at high attitude (10 kft (about 3 km) above sea level).

As seen from FIG. 12, when the area ratio S1/S is in a range from about 0.180 to about 0.232, a difference in the pitch angles at the rotating speeds of 7,200 rpm and 2,000 the pitch angles under pressures at ground level (0 m above sea level) and at high attitude (10 kft (about 3 km) above sea level) is relatively small.

Figure 15:
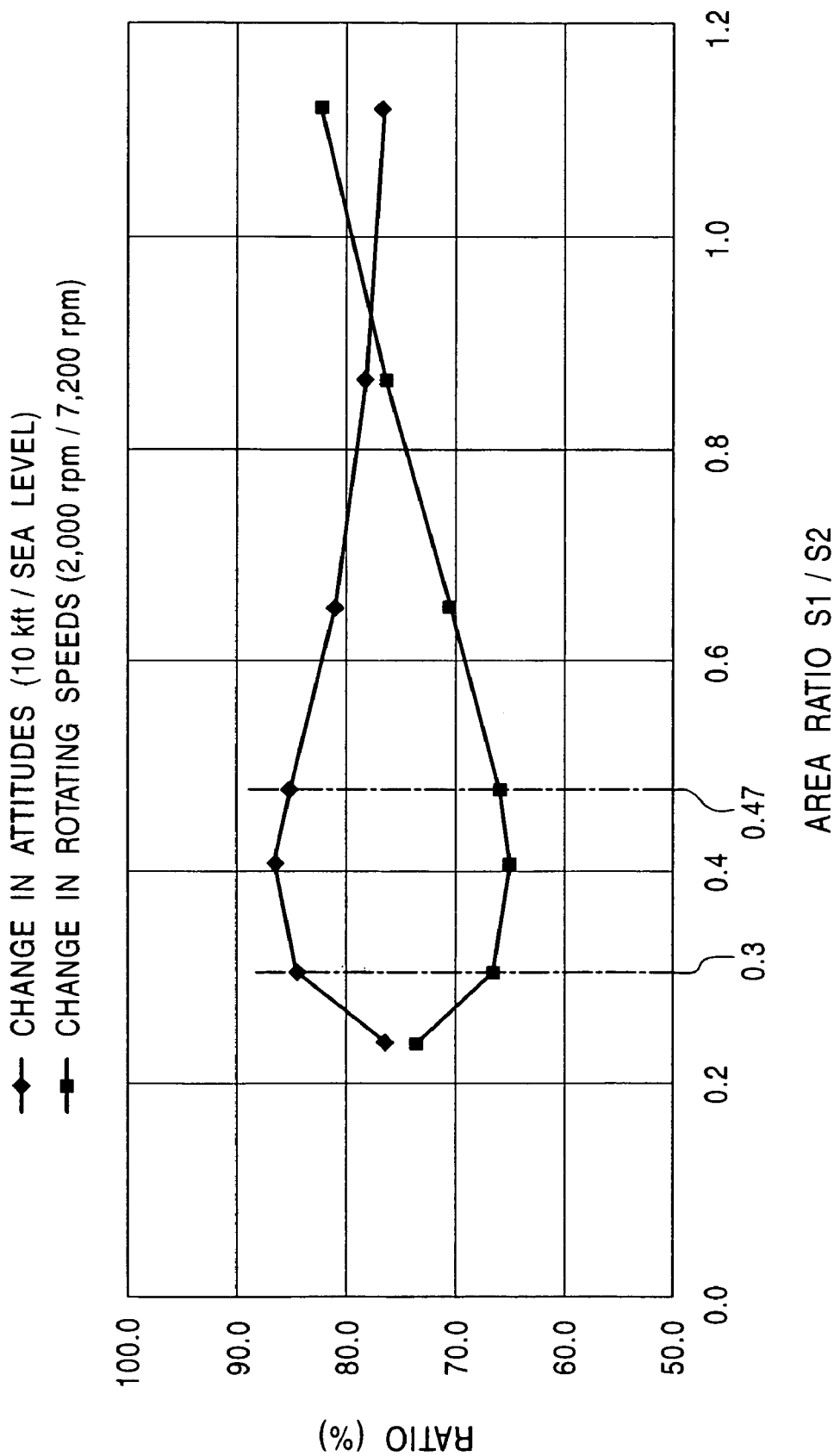
FIG. 15 is a graph illustrating the relationship between area ratio S1/S2 and ratios of the mutually corresponding pitch angles used for computing the differences shown in FIG. 14.

FIG. 15 is a graph illustrating the relationship between area ratio S1/S2 and ratios of the mutually corresponding pitch angles used for computing the differences shown in FIG. 14. As seen from FIG. 15, the same relative results are obtained as those in FIG. 14.

The above-described results of the simulation experiments lead to the following conclusion: the area of the step surface 11 preferably accounts for a considerably small fraction of the area of the front half region 6 of the magnetic head slider 30, and also the positive-pressure generating surface 12 is required to have an area so as to account for a reasonable fraction of the front half region 6.

The step surface 11 serves as a guide for guiding air to flow toward the positive-pressure generating surface 12 and the indented surface 13. If the step surface 11 extending close to the leading-side end surface S1 has a large area, a quantity of air compressed between the step surface 11 and the positive-pressure generating surface 12 increases at the moment when the magnetic head slider 30 is just levitated (at the instant of being just levitated), for example, at the rotating speed of 2,000 rpm of the magnetic disk D, thereby leading to a higher positive pressure. As a result, the pitch angle of the magnetic head slider 30 at the moment when it is just levitated becomes greater, whereby the magnetic element is likely to hit the magnetic disk D. On the other hand, if the positive-pressure generating surface 12 accounts for a small fraction of the front half region 6 of the magnetic head slider 30, when it is levitated above the magnetic disk D and the magnetic disk D rotates up to the rotating speed of, for example, 7,200 rpm, the positive pressure does not work on the magnetic head slider 30 so much, whereby the pitch angle is likely to become smaller. With respect to a pressure change, taking the balance between positive and negative pressures into consideration, it is likewise observed that the area ratios of the step surface 11 and the positive-pressure generating surface 12 to the front half region 6 are very essential factors.

According to the present invention, on the basis of the above-described results of the simulation experiments, the area ratio S1/S is set in a range from about 0.180 to about 0.232, and also the area ratio S1/S2 is set in a range from about 0.3 to about 0.47.

Next, differences in the above-mentioned pitch angles of the magnetic head slider 30 with respect to the length ratios L1/L, L1/L3, and L2/L3 will be discussed.

Figure 16:
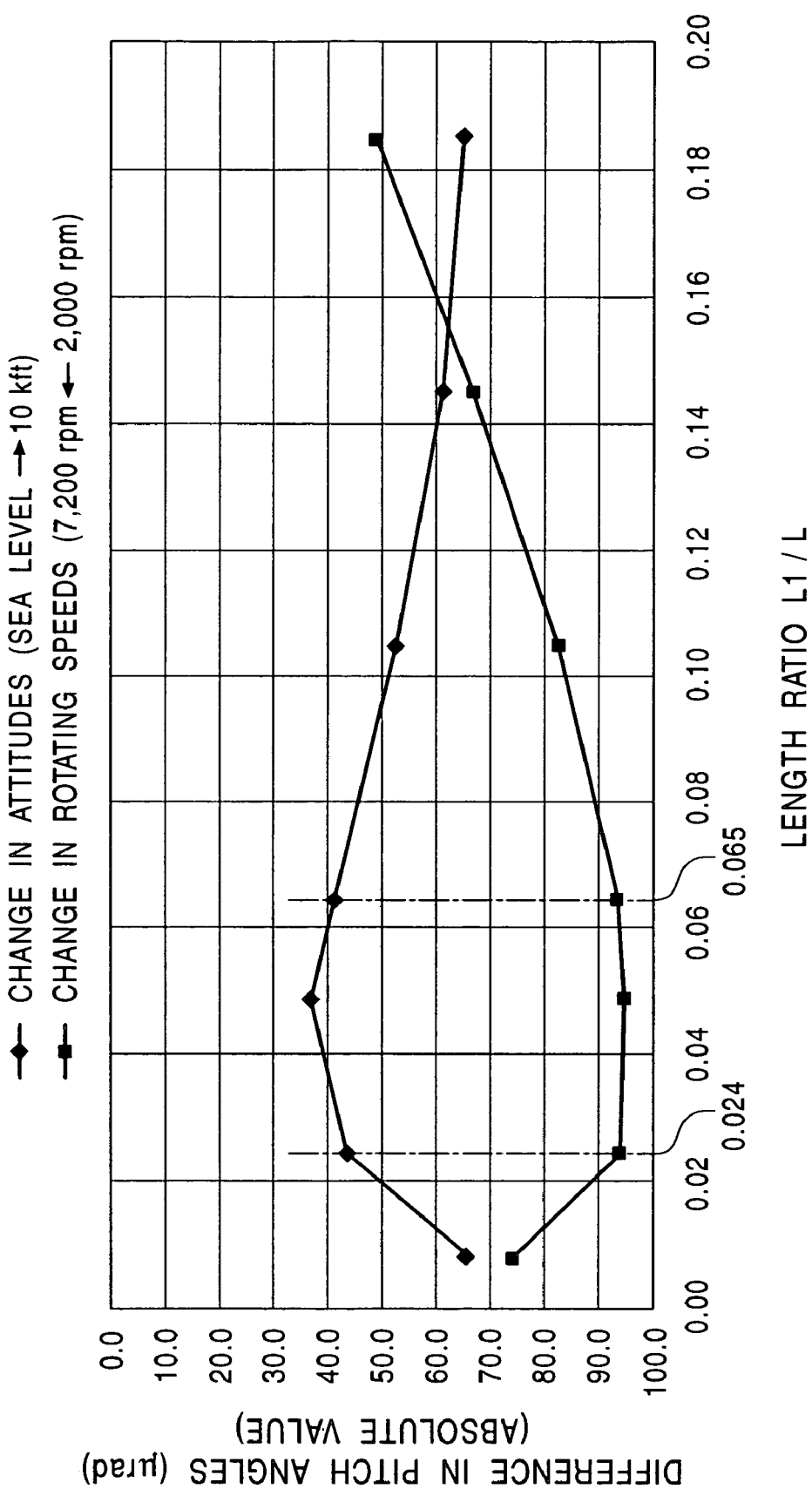
FIG. 16 is a graph illustrating the relationship between length ratio L1/L and differences in pitch angles of the magnetic head slider in accordance with the embodiment of the invention at the rotating speeds of 2,000 rpm and 7,200 rpm of the magnetic disk as well as in pitch angles of the magnetic head slider under pressures at high attitude (10 kft (about 3 km) above sea level) and at ground level (0 m above sea level)

FIG. 16 is a graph illustrating the results of the simulation experiments with respect to variation in the length ratio L1/L. As seen from FIG. 16, when the length ratio L1/L is in a range from about 0.024 to about 0.065, a difference in the pitch angles at the rotating speeds of 7,200 rpm and 2,000 rpm of the magnetic disk is relatively large. Also, a difference in the pitch angles under pressures at ground level (0 m above sea level) and at high attitude (10 kft (about 3 km) above sea level) is relatively small.

Figure 17:
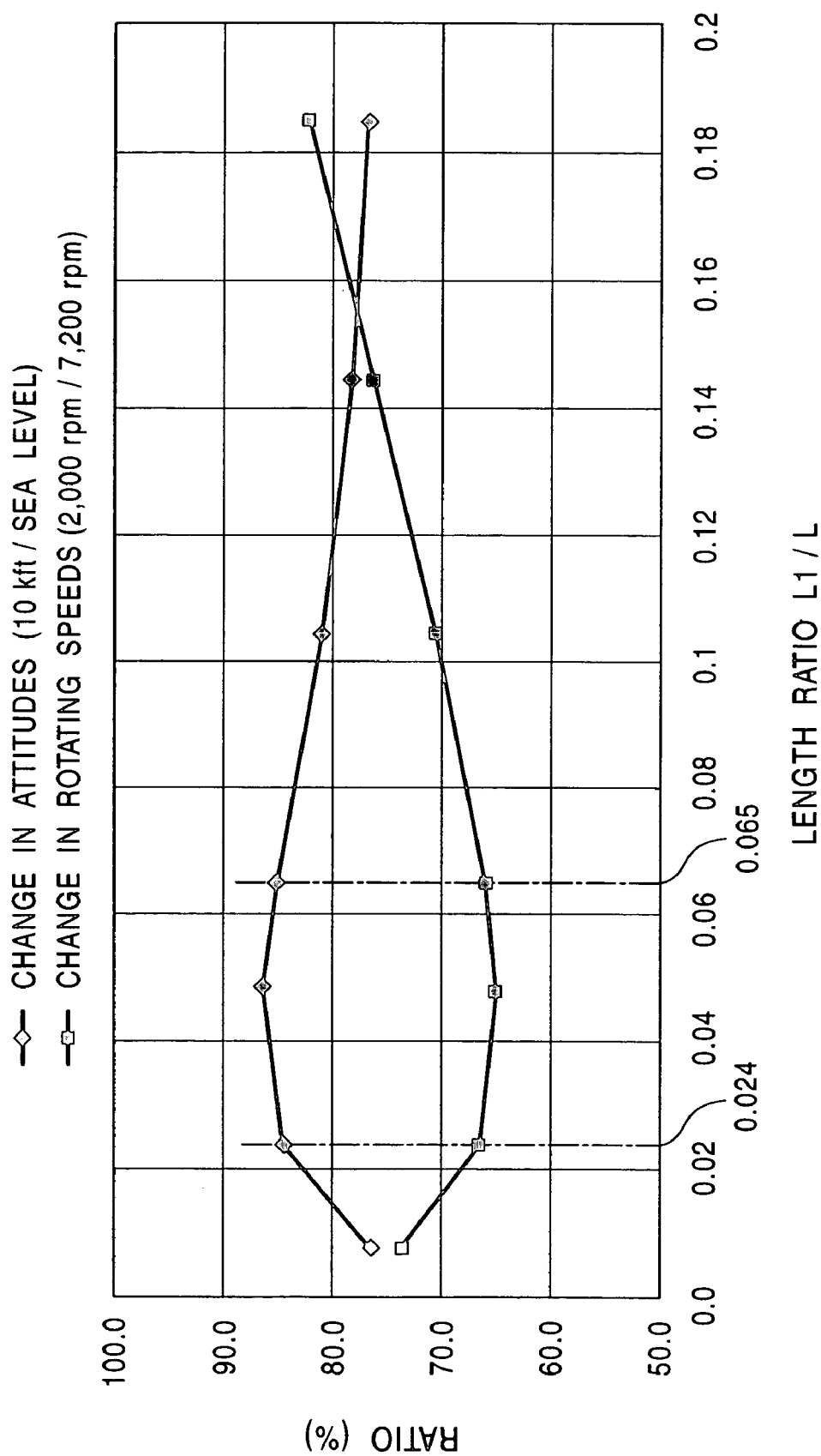
FIG. 17 is a graph illustrating the relationship between length ratio L1/L and ratios of the mutually corresponding pitch angles used for computing the differences shown in FIG. 16.

FIG. 17 is a graph illustrating the relationship between a variation in length ratio L1/L and ratios of the mutually corresponding pitch angles used for computing the differences shown in FIG. 16. As seen from FIG. 17, the same relative results are obtained as those in FIG. 16.

Figure 18:
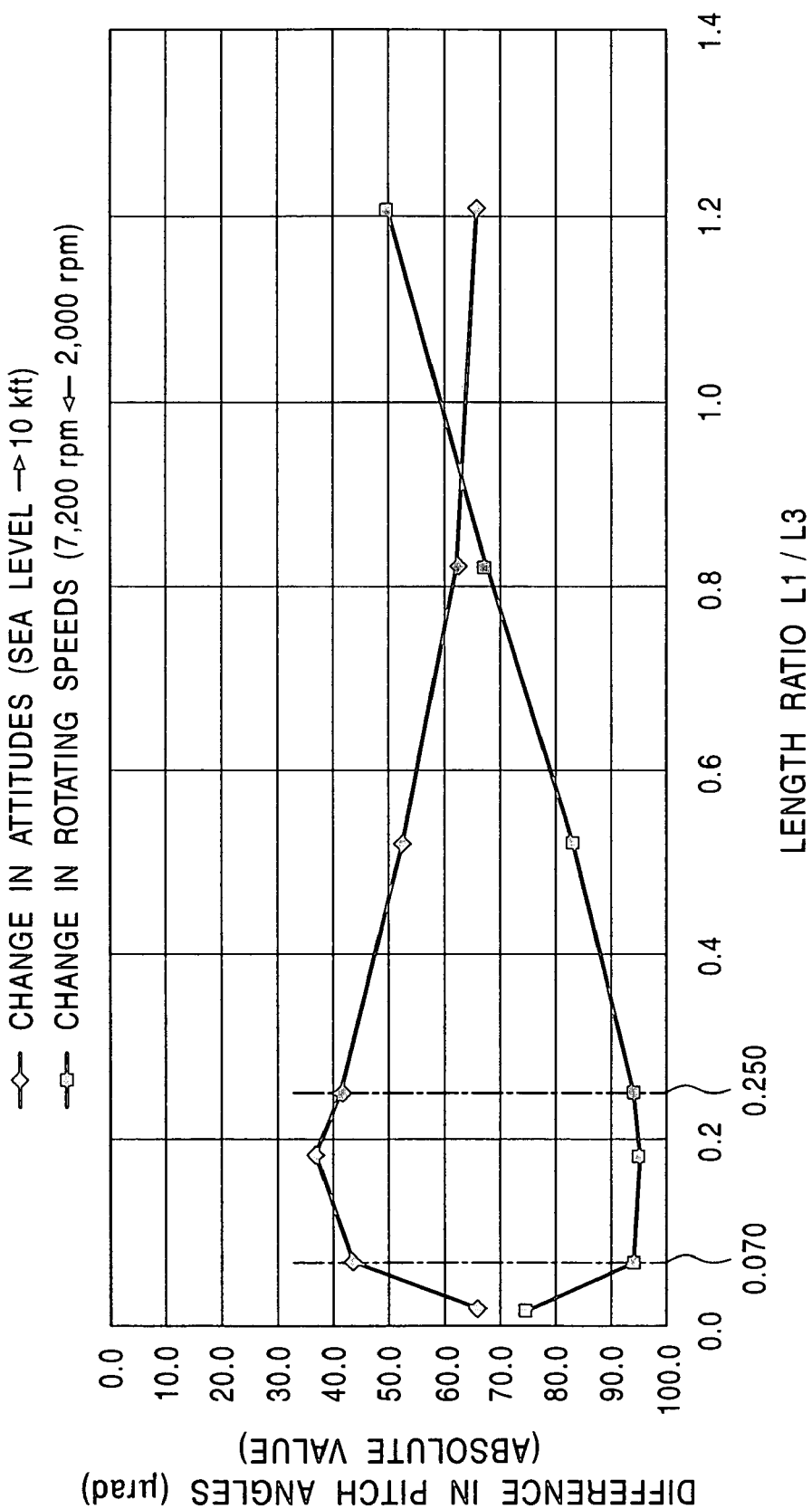
FIG. 18 is a graph illustrating the relationship between length ratio L1/L3 and differences in pitch angles of a magnetic head slider in accordance with an embodiment of the invention at the rotating speeds of 2,000 rpm and 7,200 rpm of the magnetic disk as well as in pitch angles of the magnetic head slider under pressures at high attitude (10 kft (about 3 km) above sea level) and at ground level (0 m above sea level)

FIG. 18 is a graph illustrating the results of the simulation experiments with respect to a variation in length ratio L1/L3. As seen from FIG. 18, when the length ratio L1/L3 is in a range from about 0.070 to about 0.250, a difference in the pitch angles at the rotating speeds of 7,200 rpm and 2,000 rpm of the magnetic disk is relatively large. Also, a difference in the pitch angles under pressures at ground level (0 m above sea level) and at high attitude (10 kft (about 3 km) above sea level) is relatively small.

Figure 19:
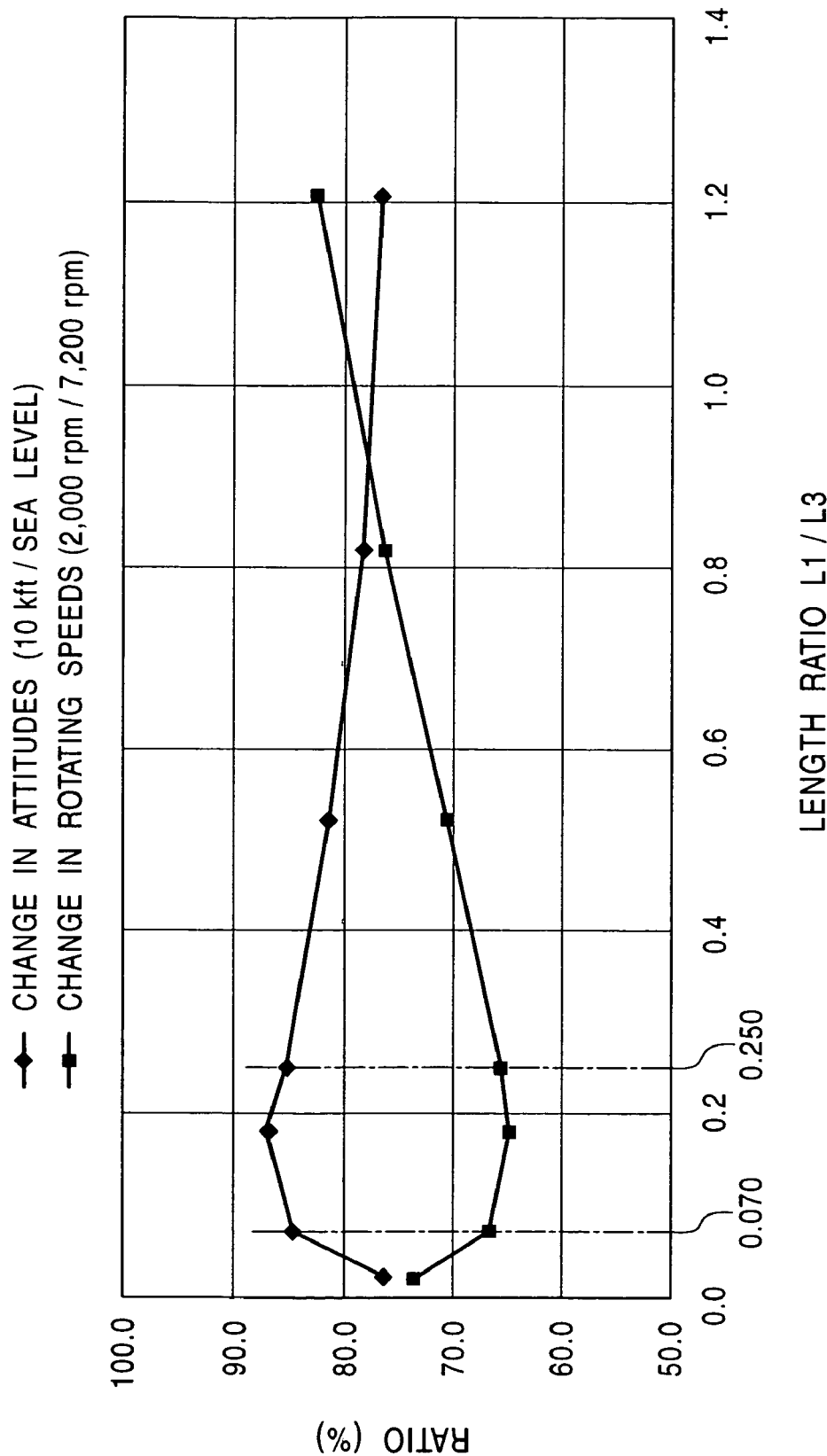
FIG. 19 is a graph illustrating the relationship between length ratio L1/L3 and ratios of the mutually corresponding pitch angles used for computing the differences shown in FIG. 18.

FIG. 19 is a graph illustrating the relationship between a variation in length ratio L1/L3 and ratios of the mutually corresponding pitch angles used for computing the differences shown in FIG. 18. As seen from FIG. 19, the same relative results are obtained as those in FIG. 18.

Figure 20:
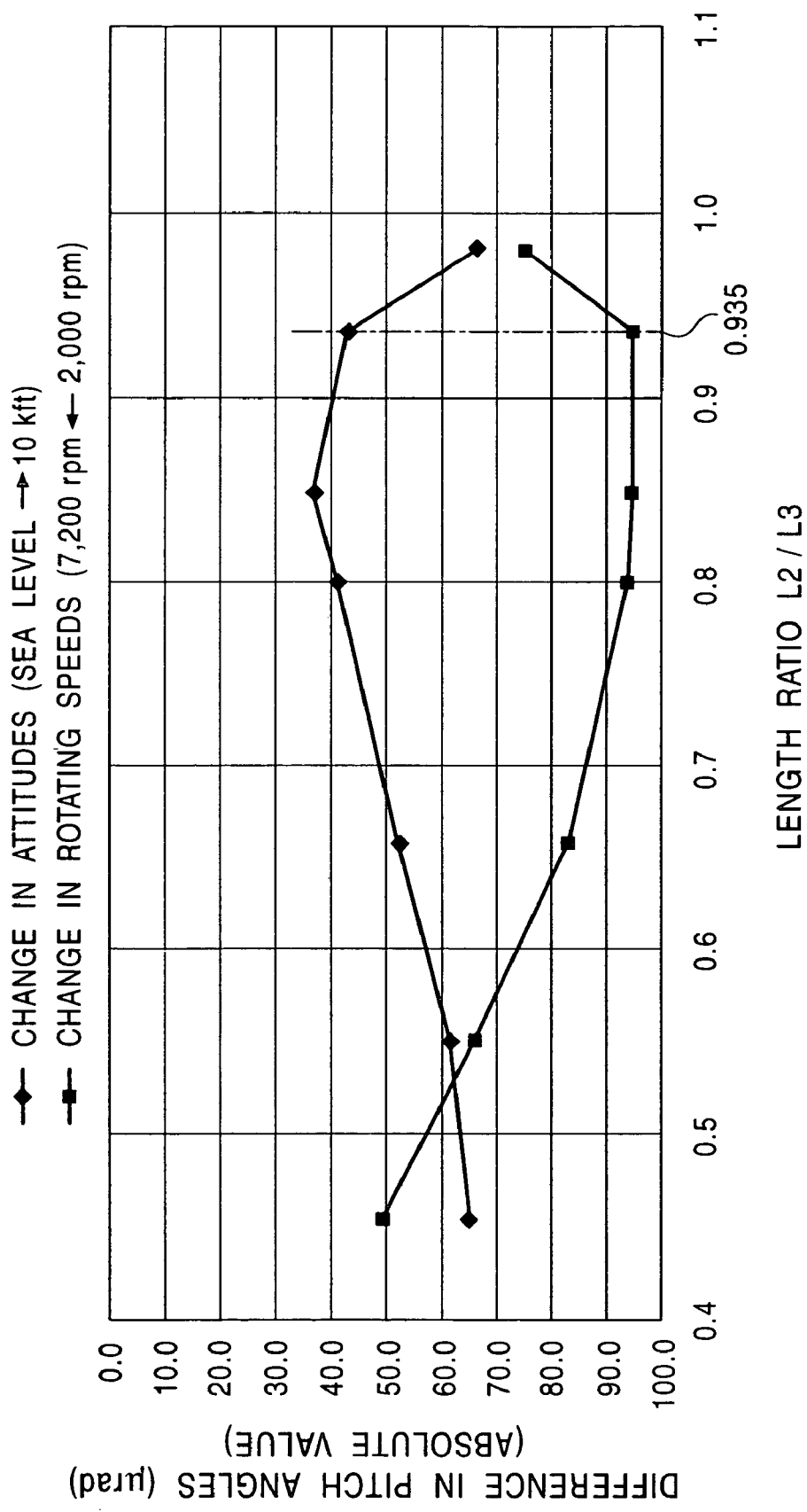
FIG. 20 is a graph illustrating the relationship between length ratio L2/L3 and differences in pitch angles of the magnetic head slider in accordance with an embodiment of the invention at the rotating speeds of 2,000 rpm and 7,200 rpm of the magnetic disk as well as in pitch angles of the magnetic head slider under pressures at high attitude (10 kft (about 3 km) above sea level) and at ground level (0 m above sea level)
Figure 21:
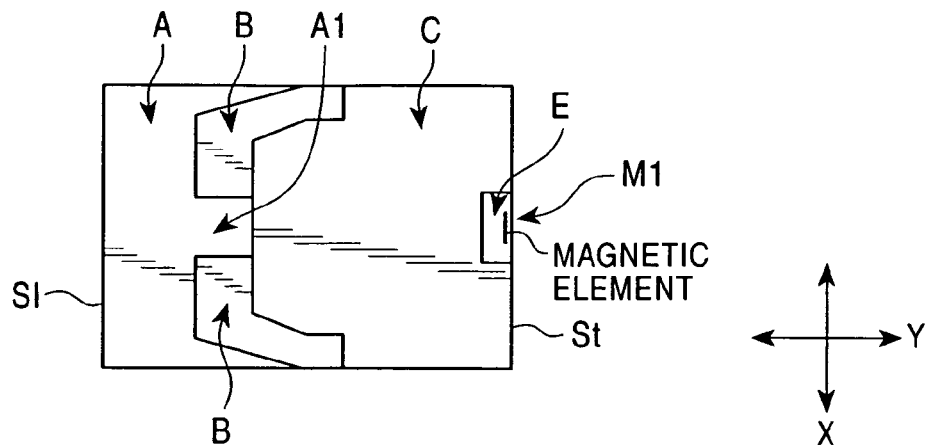
FIG. 21 is a plan view of a known magnetic head slider, illustrating its disk-facing surface.
Figure 22:
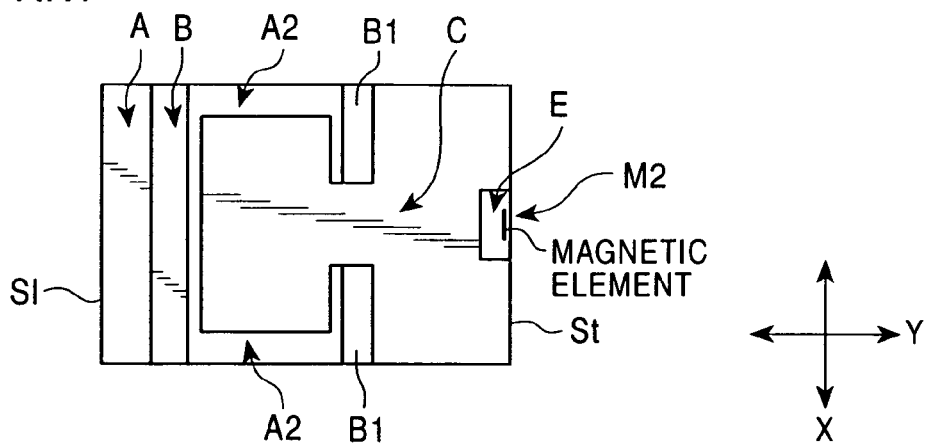
FIG. 22 is a plan view of another known magnetic head slider, illustrating its disk-facing surface.
Figure 23:
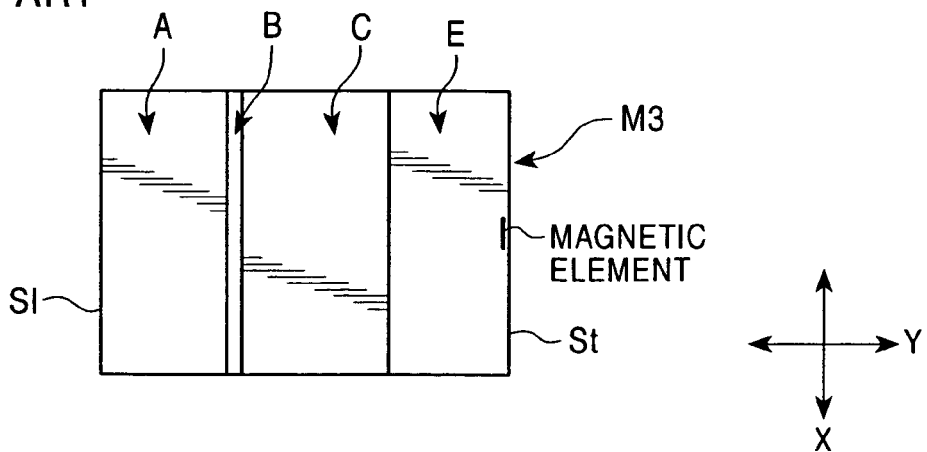
FIG. 23 is a plan view of another known magnetic head slider, illustrating its disk-facing surface.

FIG. 20 is a graph illustrating the results of the simulation experiments with respect to variation in the length ratio L2/L3. As seen from FIG. 20, when the length ratio L2/L3 is in a range from about 0.80 to about 0.935, a difference in the pitch angles at the rotating speeds of 7,200 rpm and 2,000 rpm of the magnetic disk is relatively large. Also, a difference in the pitch angles under pressures at ground level (0 m above sea level) and at high attitude (10 kft (about 3 km) above sea level) is relatively small.

As seen from the above description, by setting the length ratios L1/L, L1/L3, and L2/L3 as well as the area ratios S1/S and S1/S2 in the above-mentioned ranges, a difference in pitch angles of the magnetic head slider at the rotating speeds of 7,200 rpm and 2,000 rpm of the magnetic disk is relatively large and a difference in pitch angles of the same under pressures at ground level (0 m above sea level) and a high attitude (10 kft (about 3 km) above sea level) is relatively small.

As a conclusion of the above discussion with respect to the above length ratios, the length L1 of the step surface 11 preferably is significantly smaller than the overall length of the magnetic head slider 30, and, in addition, when the length L2 of the positive-pressure generating surface 12 is formed significantly greater than the length L1 of the step surface 11, the above-mentioned advantage can be achieved.

According to the present invention as described in detail above, by setting the areas of the step surface and the positive-pressure generating surface, both making up the front half region of the magnetic head slider, in predetermined ranges, a difference in pitch angles o the magnetic head slider at the moment when it is just levitated and during levitation can be relatively large and also, a variation of the pitch angle of the same due to a pressure change can be relatively small, thereby preventing damage of the magnetic element and achieving a stable levitation attitude of the magnetic head slider.

The invention claimed is:

1. A magnetic head apparatus comprising:
a magnetic head slider having a disk-facing surface and a read and/or write magnetic element disposed close to a trailing-side end surface thereof; and
a supporting member elastically supporting the magnetic head slider above a magnetic disk from a side opposite the disk-facing surface,
wherein the magnetic head slider is elastically supported by the supporting member so as to be pivotal in the pitch direction with a pivotal fulcrum disposed on the supporting member,
wherein the disk-facing surface has a front half region (S) extending from a leading-side end surface of the magnetic head slider to a phantom line on the disk-facing surface of the magnetic head slider extending in a direction parallel to the trailing-side end surface so as to pass through a phantom point opposite to the pivotal fulcrum of the magnetic head slider, the front half region having a step surface (S1), a positive-pressure generating surface (S2), and an indented surface formed therein from the leading-side end surface toward the trailing-side end surface in that order, wherein the step surface (S1) and the positive-pressure generating surface (S2) protrude more toward the magnetic disk than the indented surface, and the positive-pressure generating surface (S2) protrudes more toward the magnetic disk than the step surface (S1), and
wherein the step surface (S1) extends in the front half region from the leading-side end surface to a leading-side edge of the positive-pressure generating surface (S2), and wherein a surface area ratio S1/S is about 0.180 to about 0.232 and a surface area ratio S1/S2 is about 0.30 to about 0.47.

2. The magnetic head apparatus according to claim 1, wherein the disk-facing surface has a rear half region extending from the phantom line to the trailing-side end surface and having a rear indented surface formed therein extending continuously from the indented surface in the front half region, and wherein at least a portion of the rear indented surface extends continuously to the trailing-side end surface.

3. The magnetic head apparatus according to claim 1, wherein an overall length of the magnetic head slider (L) in a longitudinal direction extending from the leading-side end surface to the trailing side end surface and a portion of the step surface (L2) extending along a phantom line on the disk-facing surface in the longitudinal direction of the magnetic head slider passing through the phantom point have a length ratio L1/L of about 0.0240 to about 0.065.

4. The magnetic head apparatus according to claim 1, wherein the disk-facing surface has at lease one rod-like projection disposed thereon protruding toward the magnetic disk more than the positive-pressure generating surface.

5. The magnetic head apparatus according to claim 4, wherein the at least one rod-like projection is disposed in a rear half region extending from the phantom line to the trailing-side end surface.

6. A magnetic disk apparatus comprising:
a magnetic disk; and
a magnetic head apparatus comprising:
a magnetic head slider having a disk-facing surface and a read and/or write magnetic element disposed close to a trailing-side end surface thereof; and
a supporting member elastically supporting the magnetic head slider above a magnetic disk from a side opposite the disk-facing surface,
wherein the magnetic head slider is elastically supported by the supporting member so as to be pivotal in the pitch direction with a pivotal fulcrum disposed on the supporting member,
wherein the disk-facing surface has a front half (S) region extending from a leading-side end surface of the magnetic head slider to a phantom line on the disk-facing surface of the magnetic head slider extending in a direction parallel to the trailing-side end surface so as to pass through a phantom point opposite to the pivotal fulcrum of the magnetic head slider, the front half region having a step surface (S1), a positive-pressure generating surface (S2), and a indented surface formed therein from the leading-side end surface toward the trailing-side end surface in that order, wherein the step surface(S1) and the positive-pressure generating surface(S2) protrude more toward the magnetic disk than the indented surface, and wherein the positive-pressure generating surface(S2) protrudes more toward the magnetic disk than the step surface (S1),
wherein the step surface(S1) extends in the front half region from the leading-side end surface to a leading-side edge of the positive-pressure generating surface (S2), and a surface area ratio S1/S is about 0.180 to about 0.232 and a surface area ratio S1/S2 is about 0.30 to about 0.47, and
wherein the disk-facing surface has at lease one rod-like projection disposed thereon protruding toward the magnetic disk more than the positive-pressure generating surface,
wherein the magnetic disk is disposed so as to face the disk-facing surface of the magnetic head slider, and
wherein a pitch angle θ1 formed by a supporting surface of the magnetic head slider opposite to the disk-facing surface and the surface of the magnetic disk at the moment when the magnetic head slider is just levitated from the magnetic disk is smaller than a pitch angle θx formed by the supporting surface and the surface of the magnetic disk where the magnetic element and the rod-like projection come into contact with the surface of the magnetic disk.

7. The magnetic disk apparatus according to claim 6, wherein said at least one rod-like projection is disposed in a rear half region extending from the phantom line to the trailing-side end surface.

8. The magnetic disk apparatus according to claim 6, wherein the pitch angle θx is not less than 210 μradians.

9. A magnetic head slider configured to be supported above a magnetic disk, the magnetic head slider comprising:
a body having a leading side and a trailing side and a disk-facing surface extending there between;
a read/write magnetic element disposed on the disk-facing surface in proximately to the trailing side;
a support surface of the body opposite the disk-facing surface;
a pivot point on the support surface and a corresponding phantom point on the disk-facing surface opposite to the pivot point;
a front surface (S) extending from the leading side to the phantom point, the front surface including a step surface (S1) adjacent to the leading side and a positive-pressure generating surface (S2) adjacent to the step surface (S1),
wherein a surface area ratio S1/S is about 0.180 to about 0.232 and a surface area ratio S1/S2 is about 0.30 to about 0.47.

10. The magnetic head slider according to claim 9 further comprising an front indented surface in the front surface and a rear surface in the disk-facing surface extending from the phantom point to the trailing side and having a rear indented surface formed therein extending continuously from the front indented surface, and wherein at least a portion of the rear indented surface extends continuously to the trailing side.

11. The magnetic head slider according to claim 10 further comprising an elevated magnetic element surface in the rear indented surface in proximity to the trailing side, the elevated surface including a step surface at a first height above the rear indented surface and a positive pressure generating surface at a second height above the rear indented surface at a second height above the rear indented surface and a magnetic element in the positive-pressure generating surface, wherein the second height is greater than the first height.

12. The magnetic head slider according to claim 11 further comprising first and second elevated side surfaces in the rear indented surface in proximity to the trailing side and located on opposite sides of the elevated magnetic element surface, each elevated side surface including a step surface at a first height above the rear indented surface and a positive-pressure generating surface at a second height above the rear indented surface, wherein the second height is greater than the first height.

13. The magnetic head slider according to claim 9, wherein an overall length of the magnetic head slider (L) in a longitudinal direction extending from the leading side to the trailing side and a portion (L1) of the step surface extending along a phantom line on the disk-facing surface in the longitudinal direction of the magnetic head slider passing through the phantom point have a length ratio L1/L of about 0.0240 to about 0.065.

14. The magnetic head slider according to claim 9, wherein the disk-facing surface has at least one rod-like projection disposed thereon, protruding toward the magnetic disk more than the positive-pressure surface (S2).

15. The magnetic head slider according to claim 14, wherein the at least one rod-like projection is disposed in a rear half region extending from the phantom point to the trailing side.

* * * * *

UNITED STATES PATENT AND TRADEMARK OFFICE
CERTIFICATE OF CORRECTION

PATENT NO.        : 7,145,752 B2
APPLICATION NO.   : 10/818488
DATED             : December 5, 2006
INVENTOR(S)       : Junsei Ueda et al.

It is certified that error appears in the above-identified patent and that said Letters Patent is hereby corrected as shown below:

In the Claims

Column 18, in claim 4, line 61, after "surface has at" delete "lease" and substitute --least-- in its place.

Column 19, in claim 6, line 22, after "surface (S2), and" delete "a" and substitute --an-- in its place.

Column 19, in claim 6, line 36, after "surface has at" delete "lease" and substitute --least-- in its place.

Columns 20, in claim 9, line 2, after "surface in" delete "proximately" and substitute --proximity-- in its place.

Column 20, in claim 10, line 17, before "front indented surface" delete "an" and substitute --a-- in its place.

Column 20, in claim 11, line 30, after "surface" delete "at a second height above the rear indented surface".

Signed and Sealed this

Second Day of October, 2007

JON W. DUDAS
*Director of the United States Patent and Trademark Office*